United States Patent
Ryan et al.

(10) Patent No.: US 8,010,289 B1
(45) Date of Patent: Aug. 30, 2011

(54) METHOD AND APPARATUS FOR DETECTING AND PROCESSING LIGHTNING

(75) Inventors: Dean E. Ryan, Columbus, OH (US); Matthew Gessner, Columbus, OH (US)

(73) Assignee: Avidyne Corporation, Lincoln, MA (US)

( * ) Notice: Subject to any disclaimer, the term of this patent is extended or adjusted under 35 U.S.C. 154(b) by 0 days.

(21) Appl. No.: 11/488,792

(22) Filed: Jul. 19, 2006

Related U.S. Application Data

(60) Provisional application No. 60/700,334, filed on Jul. 19, 2005.

(51) Int. Cl.
*G01W 1/16* (2006.01)
(52) U.S. Cl. .......... 702/4; 702/3; 702/176; 702/179
(58) Field of Classification Search .......... 702/3, 4, 702/18, 58, 60, 63, 64, 182, 183, 5; 73/170.24; 382/159, 170; 342/357.13
See application file for complete search history.

(56) References Cited

U.S. PATENT DOCUMENTS

| | | | |
|---|---|---|---|
| 2,386,084 A | 10/1945 | Ayres | |
| 2,497,924 A | 2/1950 | Beach | |
| 2,982,494 A | 5/1961 | Amason | |
| 4,023,408 A * | 5/1977 | Ryan et al. | 73/170.24 |
| 4,126,866 A | 11/1978 | Pelton | |
| 4,383,260 A | 5/1983 | Ryan | |
| 4,395,906 A * | 8/1983 | Ryan et al. | 73/170.24 |
| 4,506,211 A | 3/1985 | Coleman | |
| 4,543,580 A | 9/1985 | Bent et al. | |
| 4,672,305 A | 6/1987 | Coleman | |
| 4,684,951 A | 8/1987 | Baumer | |
| 4,746,924 A | 5/1988 | Lightfoot | |
| 4,801,942 A | 1/1989 | Markson et al. | |
| 4,803,421 A | 2/1989 | Ostrander | |
| 4,873,483 A | 10/1989 | Ostrander | |
| 4,972,195 A | 11/1990 | Markson et al. | |
| 5,245,274 A * | 9/1993 | Youngquist | 324/72 |
| 5,295,071 A | 3/1994 | Kuzma et al. | |
| 5,295,072 A | 3/1994 | Stevens, Jr. et al. | |
| 5,303,152 A | 4/1994 | Moses et al. | |
| 5,305,210 A * | 4/1994 | Kuzma et al. | 702/4 |

(Continued)

OTHER PUBLICATIONS

Lightning Technologies, www.lightningtech.com, retrieved from Internet Oct. 18, 2007 3 pages.

(Continued)

*Primary Examiner* — Eliseo Ramos Feliciano
*Assistant Examiner* — Felix E Suarez
(74) *Attorney, Agent, or Firm* — Manatt, Phelps & Phillips LLP

(57) ABSTRACT

A lightning detector designed for aircraft carried applications provides for improved lightning discrimination and display. The instrument employs a relatively wide band receiver so as to retain the received waveform or digital replicas thereof. This allows more precise discrimination between desired lightning signals and noise. Signals are processed to provide for effective display of the available information. The display modes that are enabled by the signals include flash and cell mode as well as a combined flash and cell mode. The cell mode provides for generating and displaying a cumulative weight of lightning activity, giving each strike a regional effect as opposed to illustrating it as a point. Color is used to improve the user's grasp of the displayed information; the color illustrating increased intensity from the blue-green to the yellow-red. Flash mode shows locations of the different flashes within the range scale; this mode too may use color for a similar effect. Finally there is a combined flash and cell mode display.

89 Claims, 20 Drawing Sheets

U.S. PATENT DOCUMENTS

| | | | |
|---|---|---|---|
| 5,319,553 A * | 6/1994 | Gregg et al. | 702/4 |
| 5,396,220 A | 3/1995 | Markson et al. | |
| 5,500,586 A | 3/1996 | Youngquist | |
| 5,500,602 A | 3/1996 | Youngquist | |
| 5,502,371 A | 3/1996 | Youngquist | |
| 5,504,421 A | 4/1996 | Youngquist | |
| 5,528,494 A * | 6/1996 | Moses | 702/4 |
| 5,537,318 A * | 7/1996 | Moses et al. | 702/4 |
| 5,545,975 A | 8/1996 | Youngquist | |
| 5,583,972 A | 12/1996 | Miller | |
| 5,610,813 A * | 3/1997 | Greenewald et al. | 702/5 |
| 5,621,410 A | 4/1997 | Gray et al. | |
| 5,699,245 A * | 12/1997 | Herold | 702/4 |
| 5,771,020 A | 6/1998 | Markson et al. | |
| 5,991,138 A | 11/1999 | Sklar et al. | |
| 6,035,057 A * | 3/2000 | Hoffman | 382/159 |
| 6,127,966 A | 10/2000 | Erhage | |
| 6,215,294 B1 | 4/2001 | Coleman | |
| 6,246,367 B1 | 6/2001 | Markson et al. | |
| 6,256,409 B1 * | 7/2001 | Wang | 382/170 |
| 6,347,549 B1 * | 2/2002 | Ryan et al. | 73/170.24 |
| 6,405,133 B1 | 6/2002 | Schwinn et al. | |
| 6,493,633 B2 * | 12/2002 | Baron et al. | 702/3 |
| 6,560,538 B2 | 5/2003 | Schwinn et al. | |
| 6,586,920 B1 | 7/2003 | Hirakawa | |
| 6,590,529 B2 * | 7/2003 | Schwoegler | 342/357.13 |
| 6,606,564 B2 | 8/2003 | Schwinn et al. | |
| 6,768,946 B2 | 7/2004 | Okabe et al. | |
| 6,856,908 B2 | 2/2005 | Devarasetty et al. | |
| 7,039,505 B1 | 5/2006 | Southard et al. | |
| 2001/0033247 A1 | 10/2001 | Singer et al. | |
| 2002/0133295 A1 | 9/2002 | Schwinn et al. | |
| 2003/0187580 A1 | 10/2003 | Okabe et al. | |
| 2005/0264472 A1 * | 12/2005 | Rast | 345/30 |
| 2009/0166468 A1 | 7/2009 | Ryan et al. | |

OTHER PUBLICATIONS

U.S. Appl. No. 11/963,184, Dean E. Ryan, filed Dec. 21, 2007.

* cited by examiner

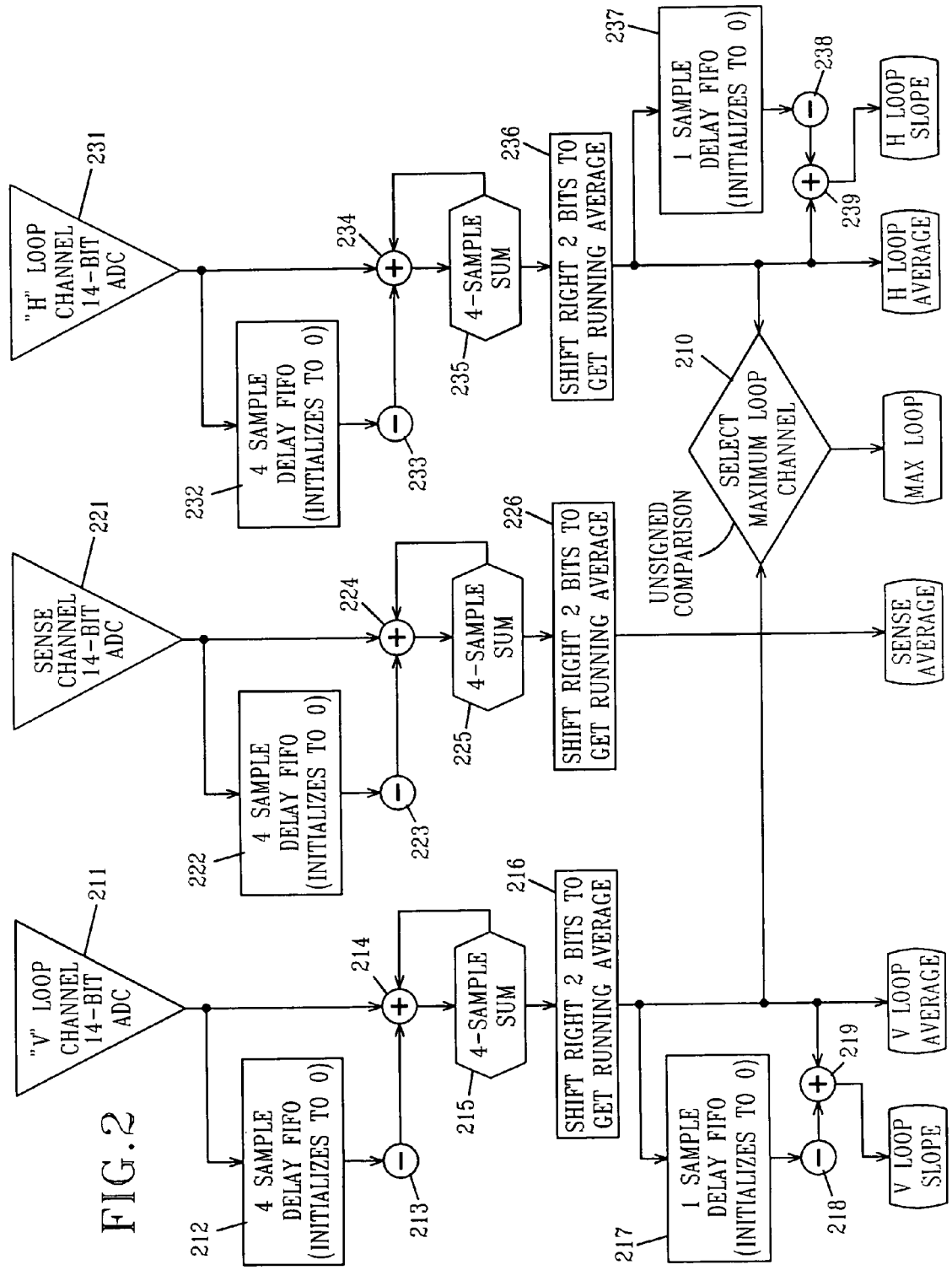

METHOD AND APPARATUS FOR DETECTING AND PROCESSING LIGHTNING

RELATED APPLICATION

This application claims the benefit of the filing date of co-pending provisional application Ser. No. 60/700,334, filed Jul. 19, 2005

TECHNICAL FIELD

The invention relates to storm mapping systems, more particularly, systems for detecting and displaying the location of lightning and more particularly, vehicle carried apparatus for performing this function.

BACKGROUND

Over the past 25 years, the aviation industry has been the beneficiary of improved storm mapping systems. See U.S. Pat. Nos. 4,023,408, 4,395,906 and 6,347,549. Those storm mapping systems took advantage of the correlation between thunderstorms and lightning discharges. The violent air currents that are hazardous to aircraft flight produce the lightning discharge. The lightning discharge also generates electromagnetic waves. Directional receiving apparatus located on board an aircraft, can determine the direction of the lightning discharge. Some information is available about the distance or range of the discharge as well. By receiving and storing this direction and distance information, a map is formed from the stored data, to give the pilot a plan view image of the storm activity relative to the aircraft.

Notwithstanding the wide utility of aircraft carried storm mapping systems there is room for significant improvement.

Because of the limited area of the display it is necessary to pick and chose just what information to display and how to display it so as to convey to the user the most important information within the limits of the display. A solution to this desire should not be too rigid but instead allow the user to configure the display parameters to meet the current needs of the user.

In addition there is a need to provide for improved signal processing in respect of at least two different problems.

While lightning is a robust radiator of electromagnetic radiation, the environment in which these instruments are used is subject to a wide variety of noise sources, including sources located on the very same vehicle as is the storm mapping system. Earlier devices have attempted to accept signals generated by lightning while excluding signals derived from noise sources. We believe that there is room for much improvement in this area.

Even if we succeed in excluding all unwanted signals, there is still the problem of extracting the information which will allow us to accurately locate the lightning. For example, ranging to close in lightning is a substantial problem if the instrument must also be able to work at reasonable ranges, say significantly greater than 100 nautical miles. We believe we have made significant improvements in this area as well.

As we describe below we believe that we can filter noise based on the waveshape of the received signals. In order to be effective this requires that our data collection be capable of preserving information descriptive of the waveshape. To this end, the data the apparatus collects is capable of describing peaks in the waveforms and relating peaks in the three different channels to each other. This allows the system to obtain a measure of correlation between the loops signals and the sense signals. FIGS. 12 and 13 illustrate the difference between an instance where the signals are correlated (FIG. 12) and uncorrelated (FIG. 13). As is described our system requires the waveforms to be correlated within specific limits before the signals will be accepted as originating with lightning.

Further we recognize there are lightning originated signals which are not desirable. In particular most systems will have a range limit; a distance beyond which signals are of no interest. It is well known that the range of radio signals is quite variable. We have determined that the mechanism by which a radio signal has its range extended mangles the waveshape. FIG. 14 is an example of what we refer to as a "channeled" lightning signal. Comparing this figure to other figures of model lightning signals shows the waveform shown in FIG. 14 is more "wiggly" than the model lightning signals. The waveshape parameters collected by embodiments of the system allows the system to differentiate a model lightning waveform from the "channeled" waveforms such as illustrated in FIG. 14.

SUMMARY OF THE INVENTION

In one aspect the invention provides a system for detecting lightning activity comprising a receiver for detecting energy emitted by lightning strikes, and a processor for processing signals from the receiver for estimating locations of detected lightning strikes relative to the system, for determining a cumulative effect of plural lightning strikes spaced in distance and time, and for generating display signals to illustrate said cumulative effect with respect to a predetermined grid.

In another aspect the invention comprises a method for detecting lightning activity comprising receiving electromagnetic energy emitted by lightning strikes, processing signals from the receiver for estimating locations of lightning strikes relative to the system and for determining a cumulative effect of plural lightning strikes spaced in distance and time, and generating display signals to illustrate said cumulative effect with respect to a predetermined grid.

In still another aspect the invention comprises a system for detecting lightning strikes based on features of waveforms of received energy, said system comprising a wide band receiver for detecting energy emitted by lightning strikes, said receiver having at least one loop channel and at least one sense channel, each of said channels generating a related signal and coupled to a signal sampler, said signal sampler generating sequences of samples for each of said signals, a signal processor responsive to said sequences of samples of said signals for generating, for each of said signals a plurality of waveform parameters, said signal processor deriving a plurality of parameters measured in signal magnitude as well as at least one parameter measured in a time duration, and aid processor processing said waveform parameters to reject signals having characteristics inconsistent with a lightning strike.

BRIEF DESCRIPTION OF THE DRAWINGS

The present invention will be described in further detail in the following portions of this specification when taken into conjunction with the attached drawing in which:

FIG. 2 is a more detailed block diagram of one component of the signal processing element of the block diagram in FIG. 1;

DETAILED DESCRIPTION OF THE DRAWINGS

Figure 1A:
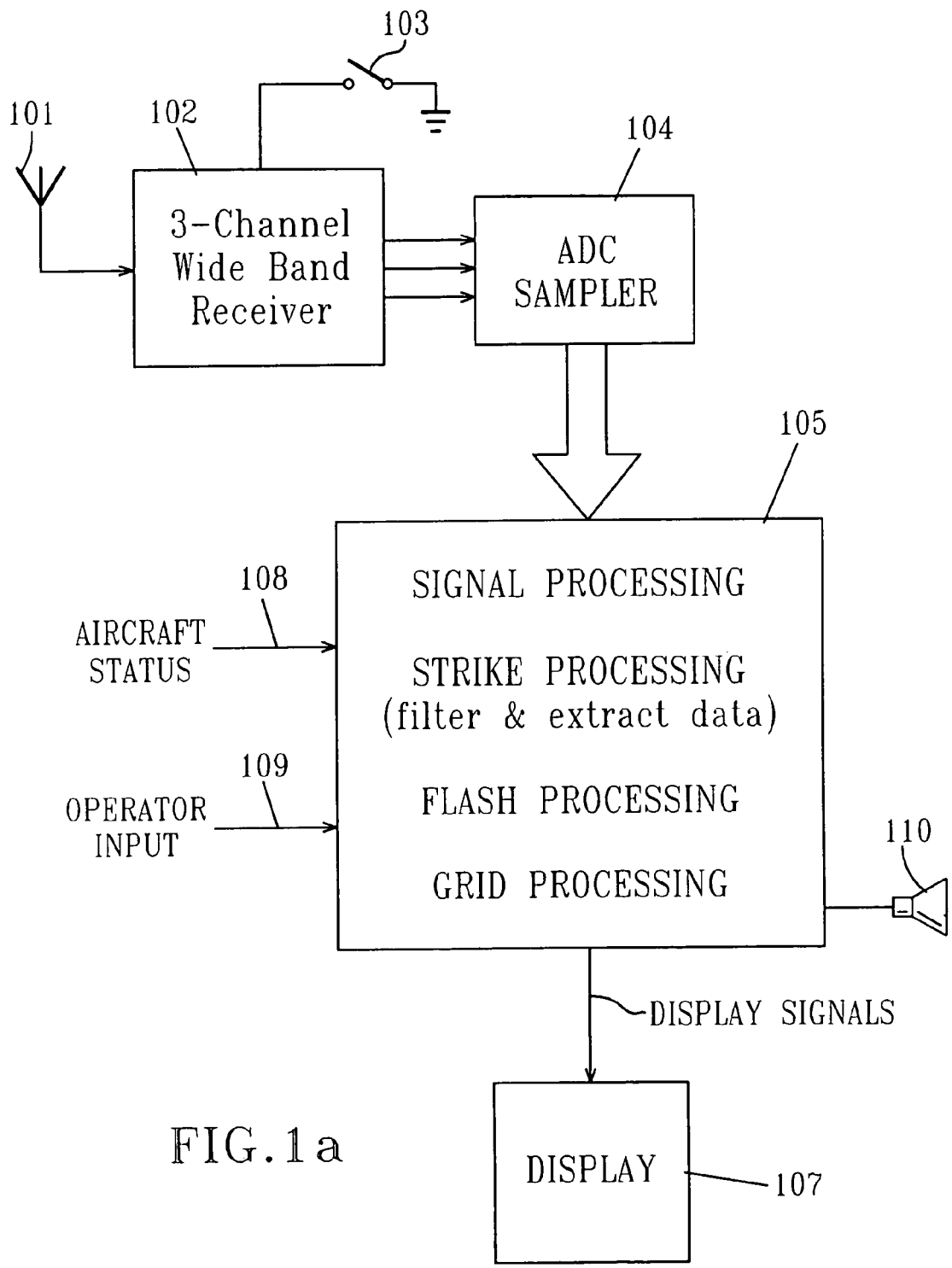
FIG. 1a is a block diagram illustrating one system in accordance with the present invention.

FIG. 1a is a block diagram of a system which includes a preferred embodiment of the invention. As is well known, lightning is a radiator of electromagnetic energy. The antenna complex 101 preferably comprises two directional loop antennas and an omni directional electric field sensor antenna. The loop antennas are preferably oriented orthogonal to each other to sense magnetic field components. The sense antenna is omni directional and senses the electric field components. Inputs from the antenna complex 101 are provided through a three-channel wide band receiver/amplifier 102. In the past, many receivers for lightning detecting equipment included a relatively narrow band receiver. We prefer to employ a relatively wide band amplifier of 200 or 300 khz band width in order the preserve the wave form of the electro magnetic radiation allowing us to reject signals which do not fall into the pattern exhibited by lightning.

Outputs of the three-channel wide-band receiver 102 are coupled to a sampler or an analog to digital converter 104. The digitized outputs of the converter 104 are provided as an input to a signal processor complex 105. In one embodiment the complex 105 included a programmable logic device which accepts the sequences of samples generated by the sampler 104, applied a first set of tests to the waveforms depicted by the sequences of samples and, with respect to those waveforms which passed the first set of tests developed a set of waveform parameters and other descriptors of the sequences of samples and passed that information to a host processor which continued the signal processing functions. In the embodiment being described the programmable logic device component of the processor complex 105 was an Altera Cyclone Field Programmable Gate Array (FPGA). While FIG. 1a shows a display 107 it is within the scope of the invention to manufacture a product comprising the antenna complex 101, receiver 102, ADC sampler 104 and processor complex 105. A user can complete a system by adding any one of many different displays, such as the display 107 shown in FIG. 1.

It will be apparent that a wide variety of signal processors and host computers can be used to implement these functions, all within the scope of the invention.

The A-D converter 104 provides, in its output channels, a regular sequence of regular signal samples, including one for each of the outputs derived from the loop antennas; and an output derived from the sense antenna.

Because of the wide band nature of the amplifier 102 the digital samples preserve the wave form of the fields sensed by the antenna complex 101. That is the digital samples faithfully represent the amplitude of the electric and magnetic field components produced by the lightning.

The signal processor complex 105 includes some simple filtering, rejecting signals which do not fit the format of lightning. In a preferred embodiment, the equipment provides signals to drive a display for a plurality of range scales, the maximum being 200 nautical miles, e.g., lightning originating beyond 200 nm should be rejected.

The signal processor complex 105, when it detects sequence of signals reflecting a wave form conforming to a lightning strike generates a set of waveform parameters (to be described) for further processing. The further processing includes determining range and bearing to each strike.

The strike data is then passed to a flash assembler. A flash assembler is described in U.S. Pat. No. 6,347,549 which, with slight modifications is adequate to generate flash data for use in a preferred embodiment of the invention. Alternatively those skilled in the art will understand how other and different equipment could also be used. The description of the flash assembler in the '549 patent limits a flash to activity occurring with gaps of not more than 50 ms. We prefer to define the duration of a flash as 1000 ms, e.g., one second. The flash assembler then passes data identifying completed flashes for further processing and combines the effect of certain flashes to generate display signals to allow the display, to the user of the cumulative effect of the plurality of lightning strikes. The signal processor complex 105 is also subject to operator input 109 and aircraft status information 108. A result of information input is the generation of a display signals for a display 107 providing information to the user concerning weather related to lightning.

Figure 1B:
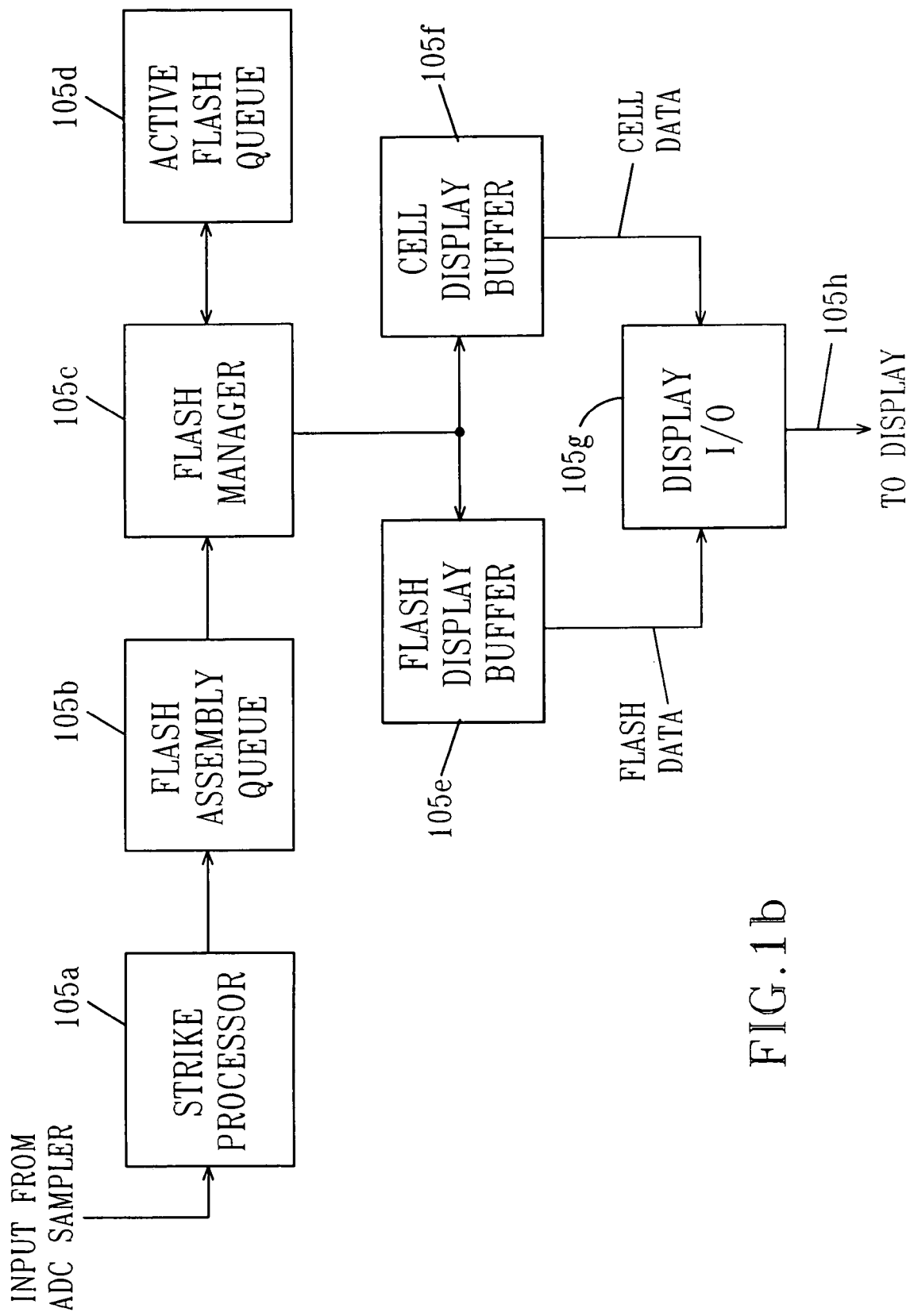
FIG. 1b is a functional block diagram illustrating the functions performed by the processor complex 105.
Figure 3A:
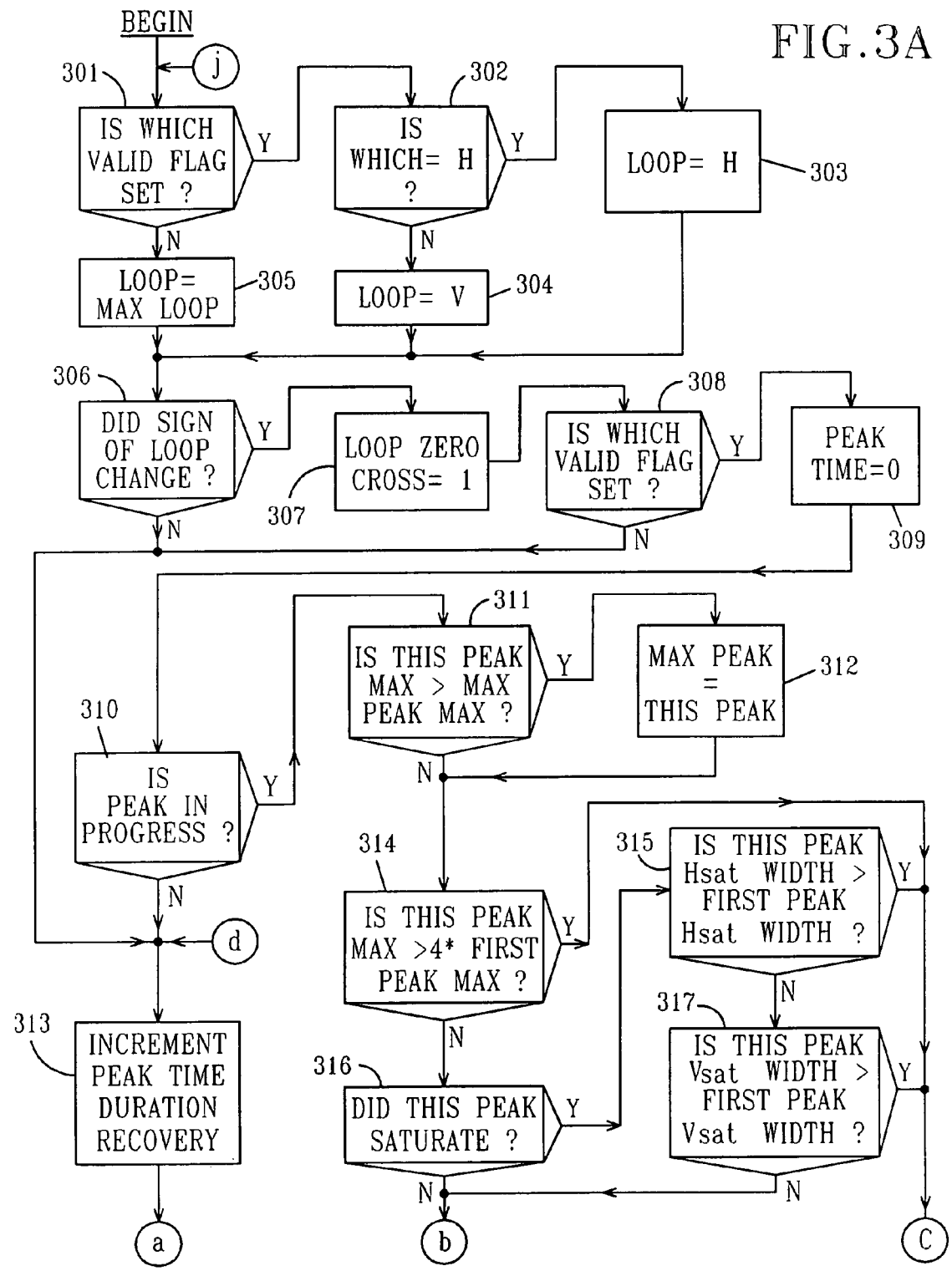
FIGS. 3A-3F is a flow diagram of the logic implemented in the signal processor component of the block diagram in FIG. 1.
Figure 3B:
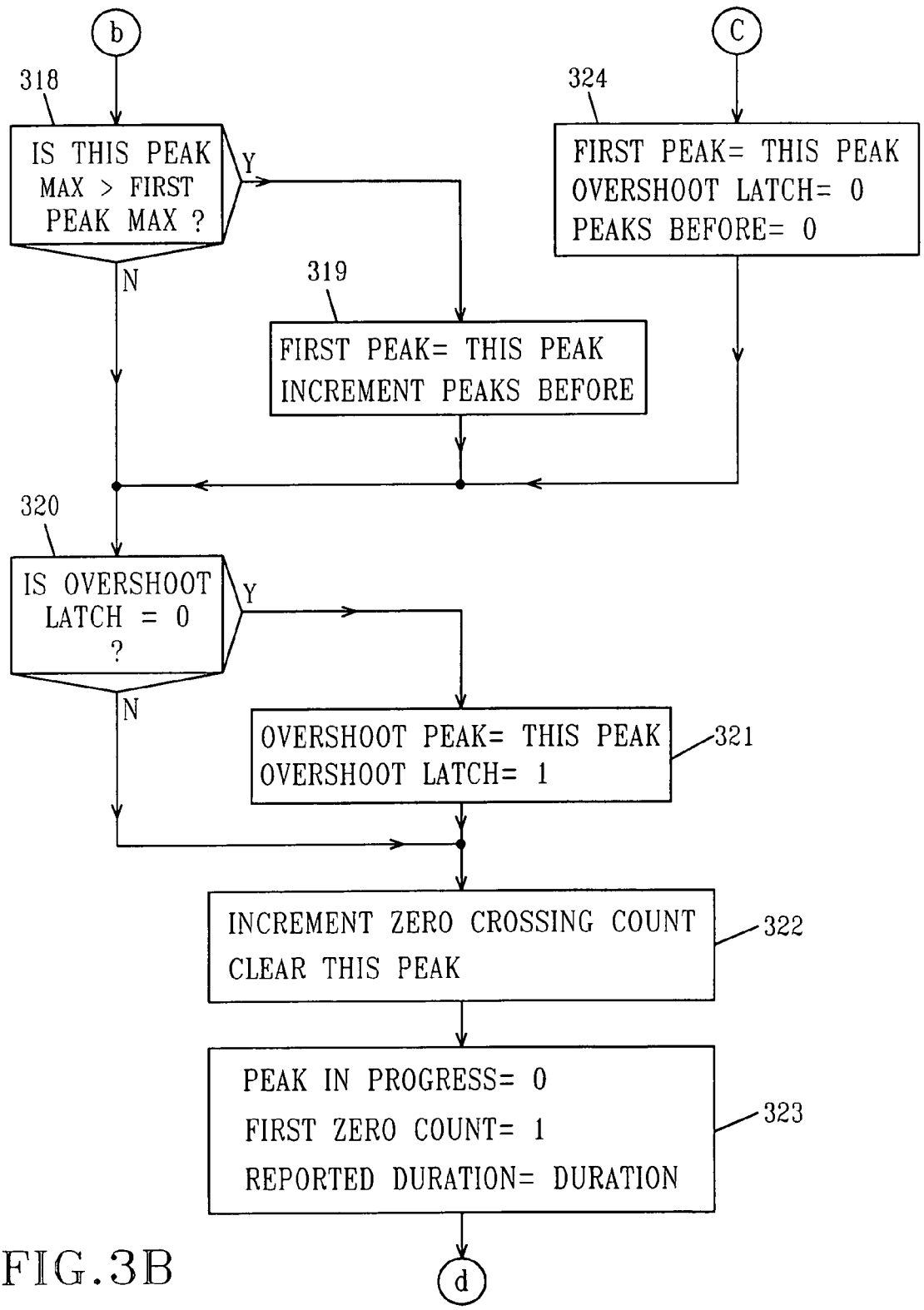
Figure 3C:
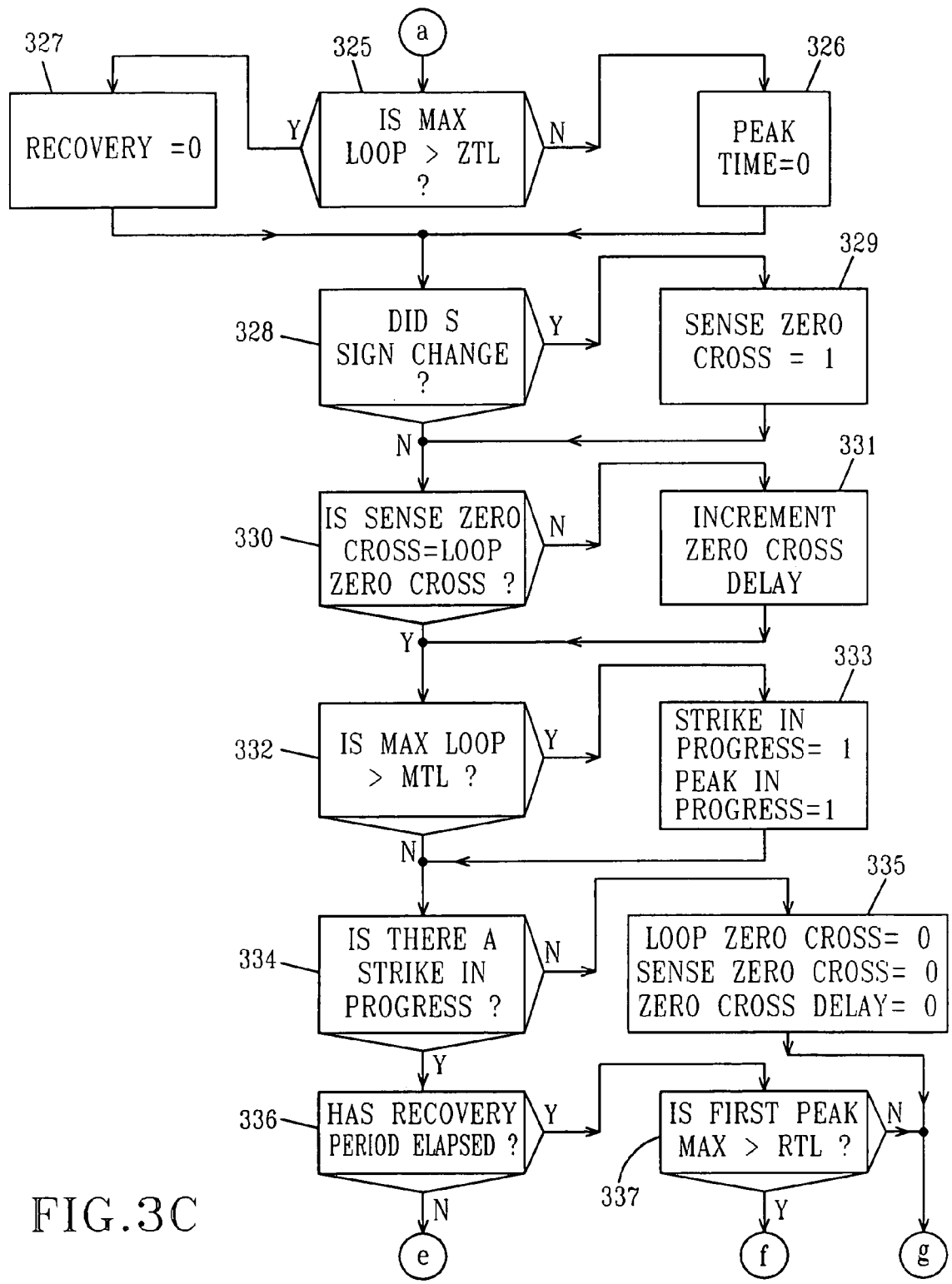
Figure 3D:
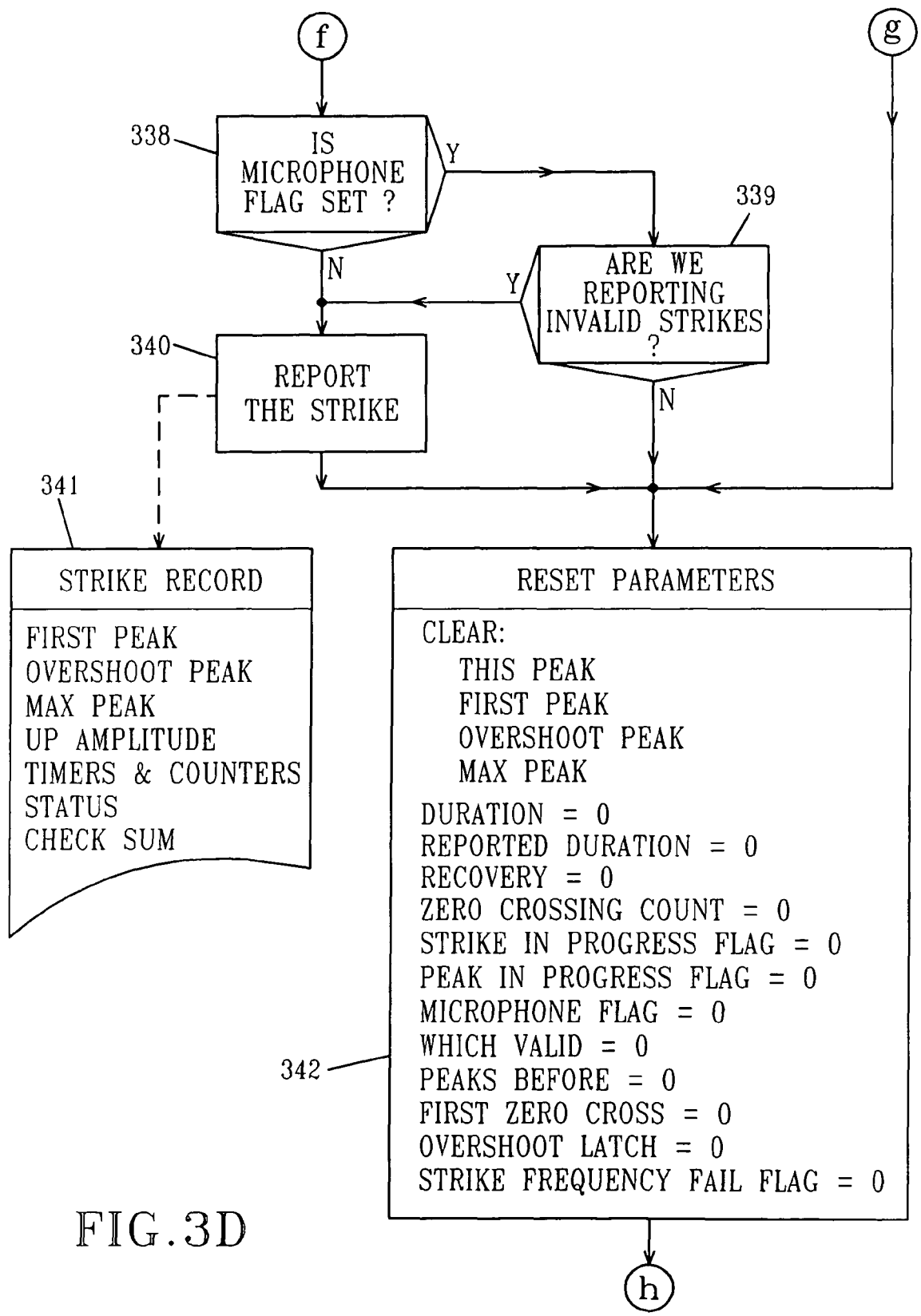
Figure 3E:
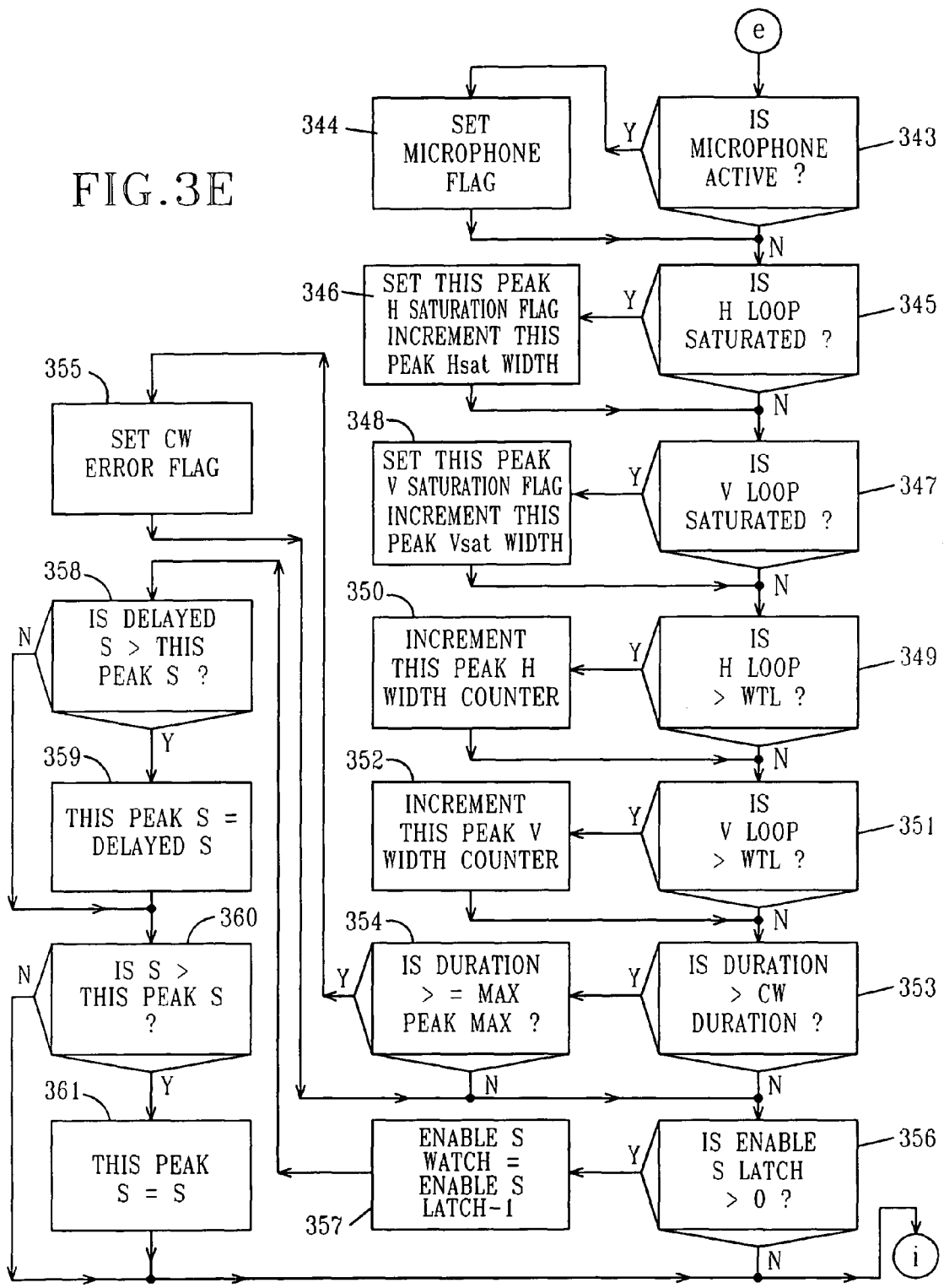
Figure 3F:
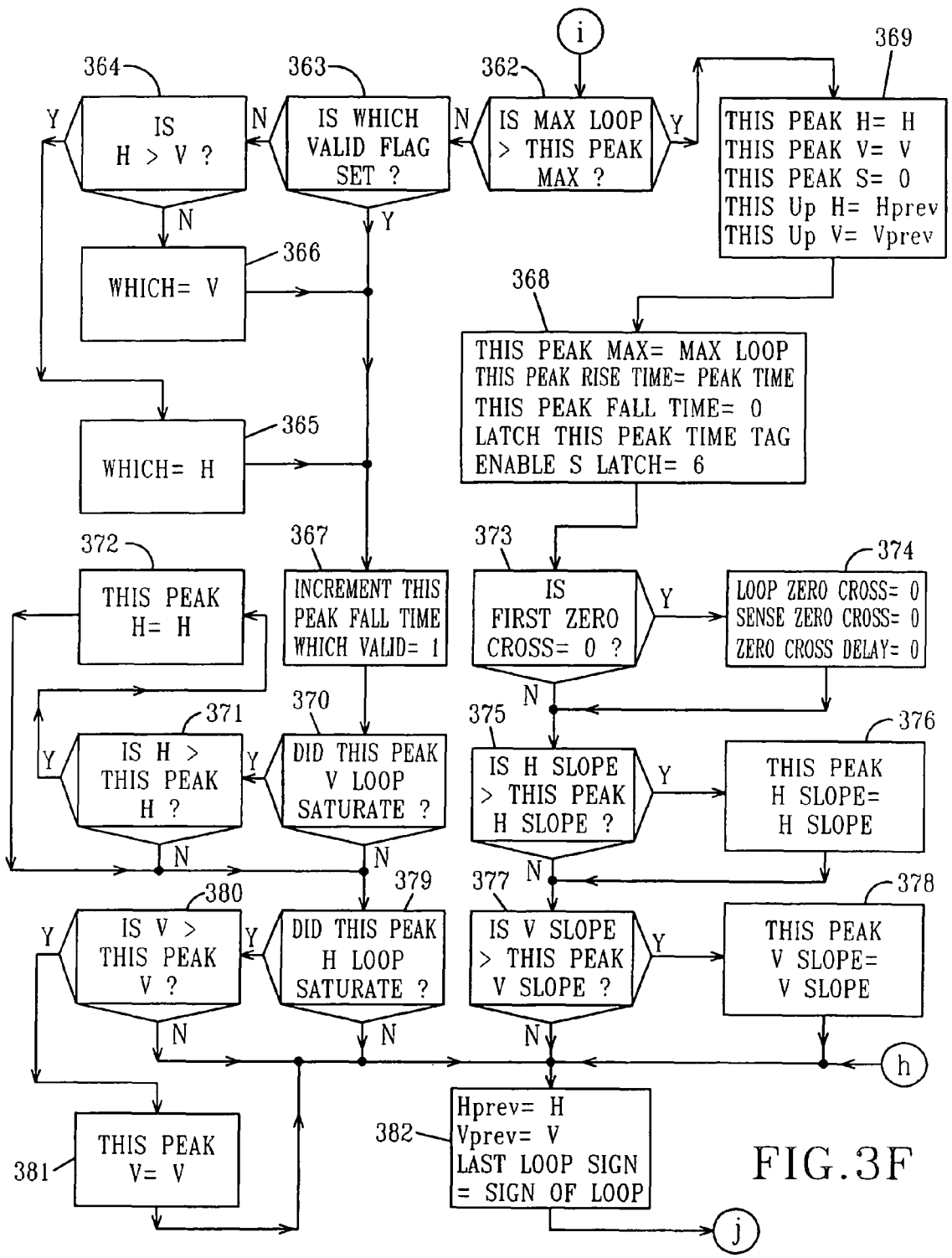

In more detail the Strike Processor 105a operates on the input samples from the ADC Sampler 104 to create a data set for selected signal sequences, i.e., those sample sequences which pass the tests imposed to identify lightning originated waveforms falling within the selected range limit. The data set includes range and bearing information as well as polarity and a time mark and perhaps related information as described in the '549 patent. This data set is passed on to the Flash Assembly Queue 105b (FIG. 1b). As described in the '549 patent the Flash Manager 105c uses the data from the Flash Assembly Queue 105b and data in the Active Flash Queue 105d to form flashes, i.e., concatenate strikes at or near a common bearing and which occur within a predetermined time of each other (in one embodiment within one second). The flash data is then used to write the Flash Display Buffer 105e and the Cell Display Buffer 105f. The Flash Display Buffer 105e is simply a listing of each of the flashes including range, bearing, polarity and weight (the number of strikes) so as to be capable of providing display signals 105h to any associated display to generate a flash display as will be described. The data in the cell display buffer 105f is organized in accordance with a predetermined grid of hexagonal elements. Each flash has an effect over a predetermined range, with the effect decreasing with distance from the origin of the flash. The data in the cell display buffer 105h is generated by first summing, for any cell, the total weight of flashes affecting that cell. There is a different cell display buffer for each different range scale within the capability of a display. The data stored in the cell (color index) is an index reflecting the weight calculated for that cell and the particular range scale of the related display.

The signal processor complex 105 also operates an alert speaker 110 based on the data in the flash buffer. In particular we have found that extremely close in lightning should usually be called to the attention of the pilot. We have selected 5 nmi as the threshold, i.e., lightning within a 5 nmi range will generate an audible alert unless suppressed. The audible alert announces the presence of lightning as well as the quadrant or more specific bearing data, e.g., "Lightning at One O'clock". While the audible alert can be helpful, in the case of extreme close-in activity multiple callouts can be an annoyance. Therefore we prefer that after the second callout at the same or an adjacent bearing within a predetermined time, that callouts be suppressed until the expiration of that time. A suitable time might be 3 minutes. In addition one of the operator inputs 109 allows the operator to suppress or inhibit audible callouts at will.

In the search for a method of displaying lightning data in a manner that represents regions of activity, the following considerations are important:

The images must be visually appealing and informative.

The lightning images must be distinguishable from typical RADAR images. To avoid confusion, it should be clear to the operator that they are looking at a depiction of lightning data, not RADAR.

Color should be used to depict the relative intensity of the lightning within a region.

The image should de-accentuate non-lightning data, and data that varies from the model such as radial spread.

Although some of these considerations appear to be mutually exclusive, a method has been devised that accommodates all of the above goals. This method involves dividing the display region into a hexagonal grid (refer to FIG. 4). Each element of the grid (i.e., a cell) will have an associated weight, which will be used to determine the color with which the element is drawn. The image is then constructed from the hexagonal grid using the following considerations:

A colored hexagon is drawn for each cell, not some other shape.

Colored hexagons are separated by a distinct black hexagonal grid; the colored regions do not touch one another.

The result is an image that is visually distinct and appealing. The black hexagonal grid that separates the hexagons creates a unique appearance that can be readily distinguished from typical RADAR images. The hexagonal grid lightning images are not necessarily overlaid on RADAR images, but it is important that the operator be aware that it is lightning data, not RADAR images, being observed.

By selecting the weight properly (as described below), the higher weights will tend to be where the lightning data clusters. This will tend to de-accentuate non-lightning data such as radial spread. By selecting the colors associated with the lowest weights so that they are somewhat darker and more subdued, the visual presentation will help the operator to focus on the regions of greatest interest. A sample color selection that has been used with good results can be found in Table 1 below.

TABLE 1

Sample color assignments for 8-level weights.

| Index | Color Description | R | G | B |
|---|---|---|---|---|
| 0 | Black (or invisible) | 0.0 | 0.0 | 0.0 |
| 1 | dark blue-green | 0.0 | 0.3 | 0.8 |
| 2 | dim green | 0.0 | 0.6 | 0.2 |
| 3 | green-yellow | 0.5 | 0.8 | 0.0 |
| 4 | Yellow | 1.0 | 1.0 | 0.0 |
| 5 | orange-yellow | 1.0 | 0.7 | 0.0 |
| 6 | Orange | 1.0 | 0.5 | 0.0 |
| 7 | Red | 1.0 | 0.0 | 0.0 |

The relationship between the weight of a hexagon and the color index used for the hexagon is best described by relying on two parameters. The two parameters include the desired range scale and the weight. The color of the hexagon is obtained from the two parameters. This is useful since each range scale may have a different relationship between weight and color. It has been found that scattered thunderstorm activity displayed at longer range scales can lead to a screen-full of colored hexagons that make it appear that there is an impenetrable mass of activity. To prevent this, and to de-accentuate radial spread, the longer ranges use black for the lowest weights. Color does not show up until the weight is substantial enough to be a clear indication of thunderstorm activity. This helps the pilot to find the true areas of activity without an overwhelming solid mass of color; however it introduces a concern that light to moderate activity may not be displayed at close ranges. To resolve this concern an indication is provided to the pilot when viewing the longer range scales that there is activity on the 25 nmi range scale. The usefulness of this approach to minimize radial spread cannot be overstated. This technique of accentuating the more intense centers of activity provides information to the pilot that has previously been unattainable with airborne lightning detection equipment.

The hexagonal depiction of the lightning data may be overlaid with RADAR data by drawing only the grid lines of the hexagonal grid. The center of each hexagon is transparent to allow the radar data to be viewed through the grid. The edges of each hexagon may be drawn in the color associated with its weight and are bordered with black to allow it to be clearly distinguished from the RADAR image behind it. The hexagons are drawn in order of increasing weight so that the highest intensity hexagons appear in front of the lower intensity hexagons.

Figure 4:
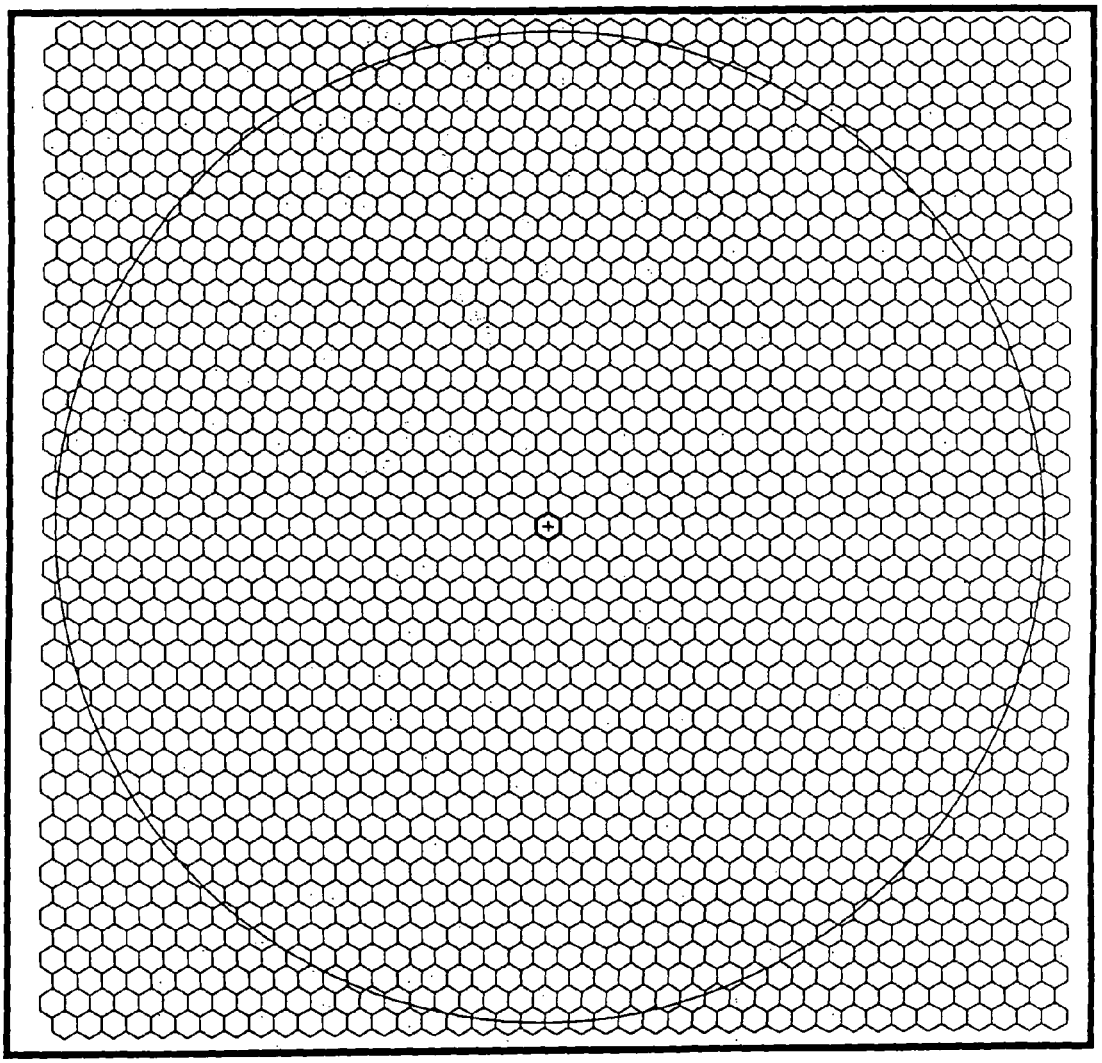
FIG. 4 illustrates the preferred grid format for one type of display.

In practice the following considerations have been found to be desirable:

a. Each hexagonal element (or simply each hexagon) should be oriented with a point up as shown in FIG. 4. The vertices of the hexagon should be at 12 o'clock, 2 o'clock, 4 o'clock, 6 o'clock, 8 o'clock, and 10 o'clock with respect to the center of the hexagon.

b. If the number of rows and columns is odd as preferred, then there is a "center" hex.

c. The range of the image should be defined as the distance from the center of the first hex in the middle row to the center of the last hex in the middle row. This accommodates the half-hex shift that occurs in the rows immediately above and below the middle row.

d. Depending on other information shown on the display, the entire grid may be displayed, or the image may be limited to some portion of the grid.

Flash Mode

A flash is a series of strikes that occur within a very short period of time (up to about 1 second) at the same location. Flash mode provides a display of each flash after the individual lightning return strokes have been reassembled into flashes. Some enhancements of this display mode are described in the following sections.

Colored Flashes

It would be desirable to provide a flash mode that is more useful than the monochrome display of dots or symbols previously used. Color is one method of enhancing this method of lightning display. There are many methods that might be used to assign the color to strikes including the age of a strike or the number of return strokes comprising the flash. Although these approaches may be useful they result in a mixing of colored flash indications that is difficult to interpret in any meaningful way.

To provide coloration of the flashes that can be quickly and easily interpreted to gain some meaningful understanding of the thunderstorm activity, the flashes are colored according to the cell that they would fall into. More specifically, the color of each flash comes from the cell mode hexagon that it falls into for the shortest range cell image that contains the strike. So for instance, a flash at 70 nmi would get its color from the 100 nmi cell mode hexagon that it falls into.

This method of selecting the color allows the pilot to see where the flashes are as well as where the most intense centers of thunderstorm activity are.

Reduction of Radial Spread

It should be noted that a fairly simple extension of the colored flashes concept can provide tremendous improvements to the radial spread shown in the flash mode. If the color of the hexagonal cell for a given flash is black, then the flash is not displayed at all. In the preferred embodiment, black flashes would not even be transmitted to the display.

Flash Clusters

The process of assembling return strokes into flashes helps to refine the location of the flash by combining the range and bearing estimates of each detected return stroke; however it has the drawback of reducing the number of displayed events on the screen. In highly active regions of thunderstorm activity the average number of strikes in a flash will increase, causing the more active regions to be minimized to some degree.

Figure 5:
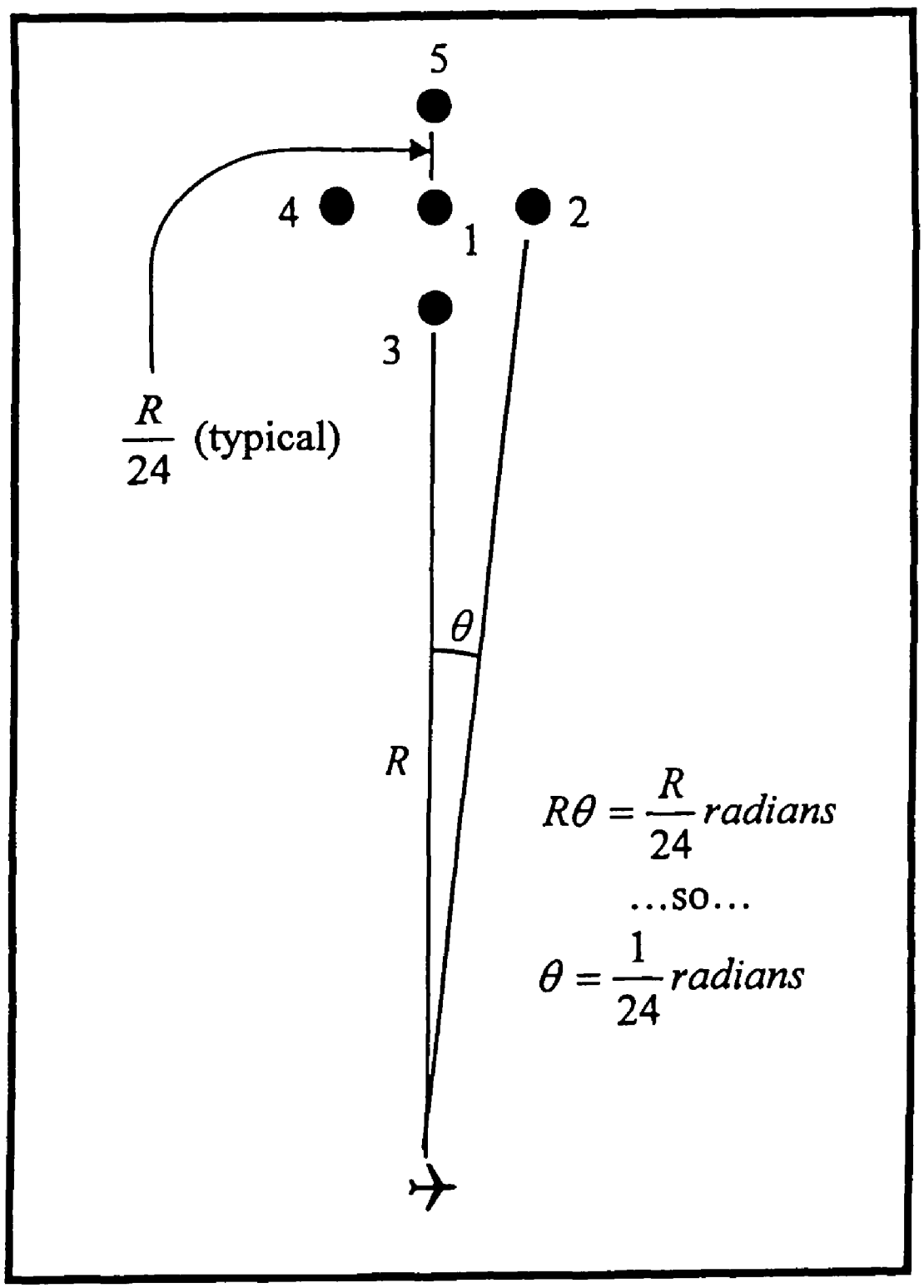
FIG. 5 shows a preferred distribution of strikes in a flash.
Figure 6:
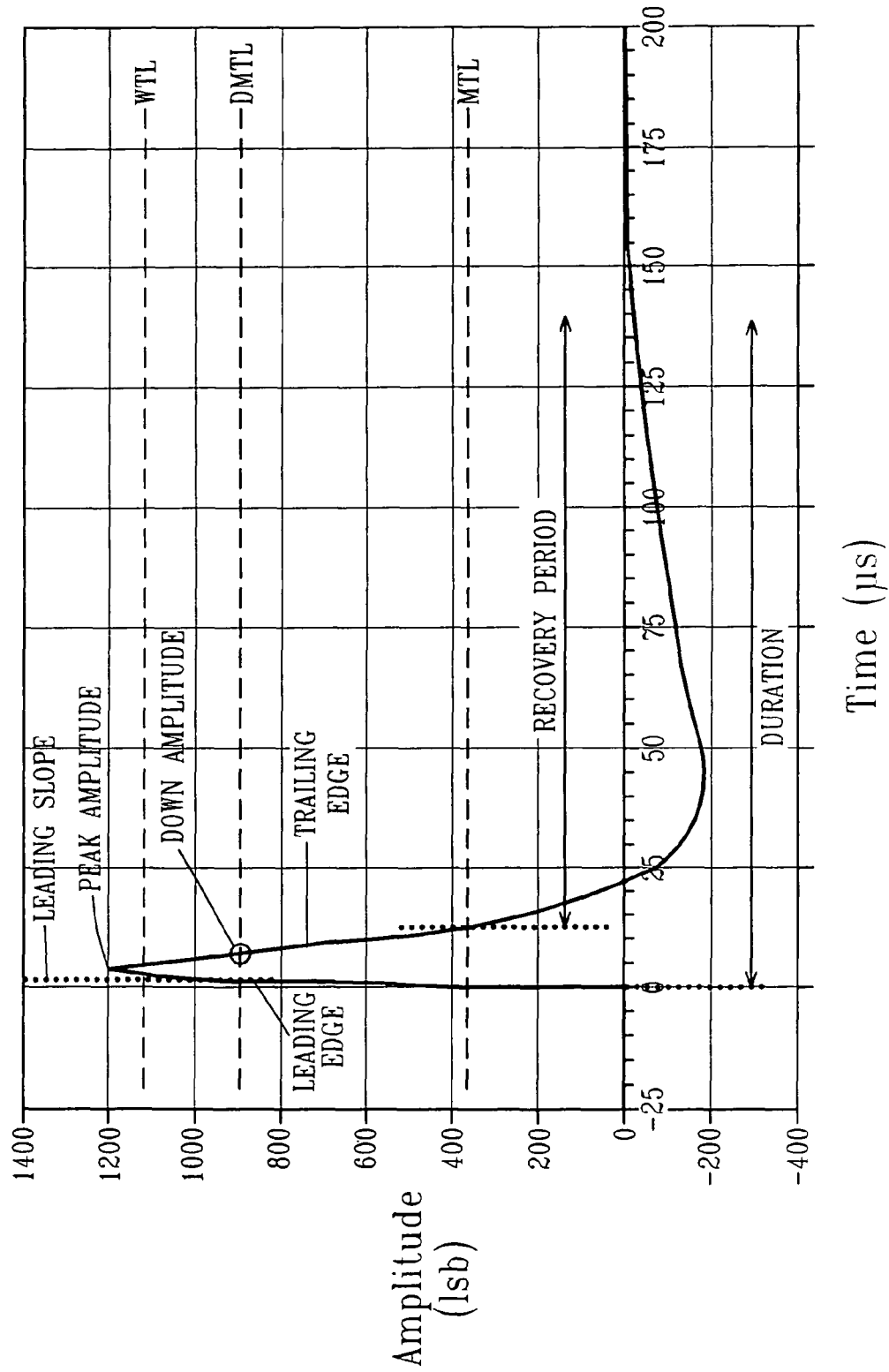
FIG. 6 shows the components of a model lightning strike.

To resolve this without losing the benefits of flash assembly, each flash is drawn as a cluster of strikes. The number of strikes shown in the cluster will be equal to the weight (number of strikes) of the flash up to a maximum of five strikes. FIG. 5 shows the relationship between the first displayed strike and the second through fifth.

In practice a separation between the initial strike and the additional strikes worked well as a function of range, because it is undesirable for the closer flash clusters to look as if they are widely separated when the range scale is decreased. It is also a logical choice since the range and bearing of the individual strikes can be measured more accurately at closer ranges. The factor selected in the preferred embodiment was range divided by 24. As shown in FIG. 5, this same distance was used between the first strike and all four of the additional strikes. Since the center is a measure of range and bearing from the host, it was necessary to relate R/24 to bearing. A reasonable estimate for the bearing offset can be obtained by setting the length of the arc (Rθ) to R/24. Solving for θ we find that it is one 24th of a radian. Therefore the position of each additional strike is found as follows:

| Position | Range | Bearing |
|---|---|---|
| 1 | Center Range | Center Bearing |
| 2 | Center Range | Center Bearing + 1/24 radian |
| 3 | 23/24 * Center Range | Center Bearing |
| 4 | Center Range | Center Bearing − 1/24 radian |
| 5 | 25/24 * Center Range | Center Bearing |

Flash+Cell Mode

Figure 7A:
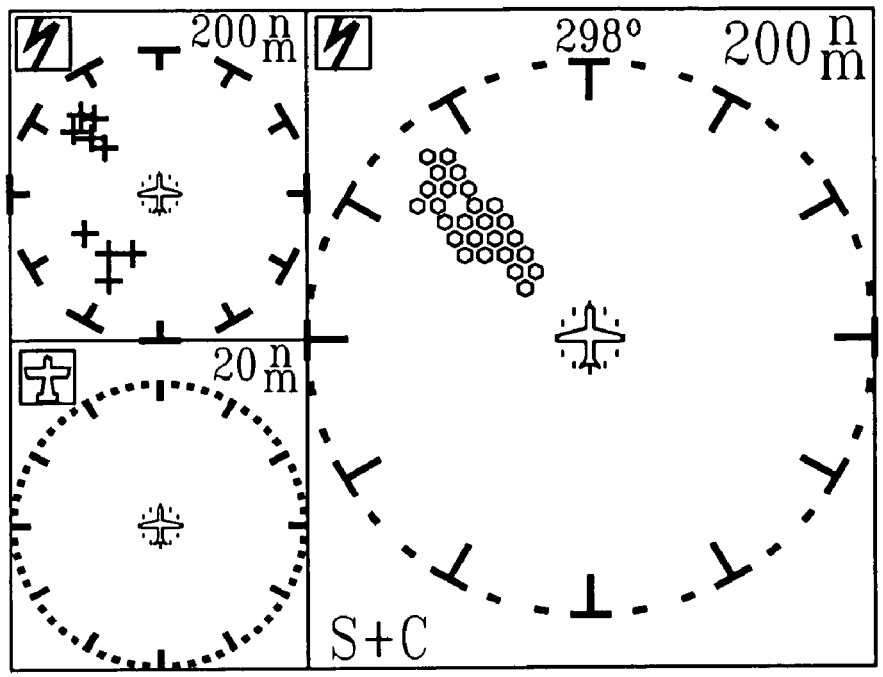
FIG. 7 shows sample images of the combined flash and cell mode display.
Figure 7B:
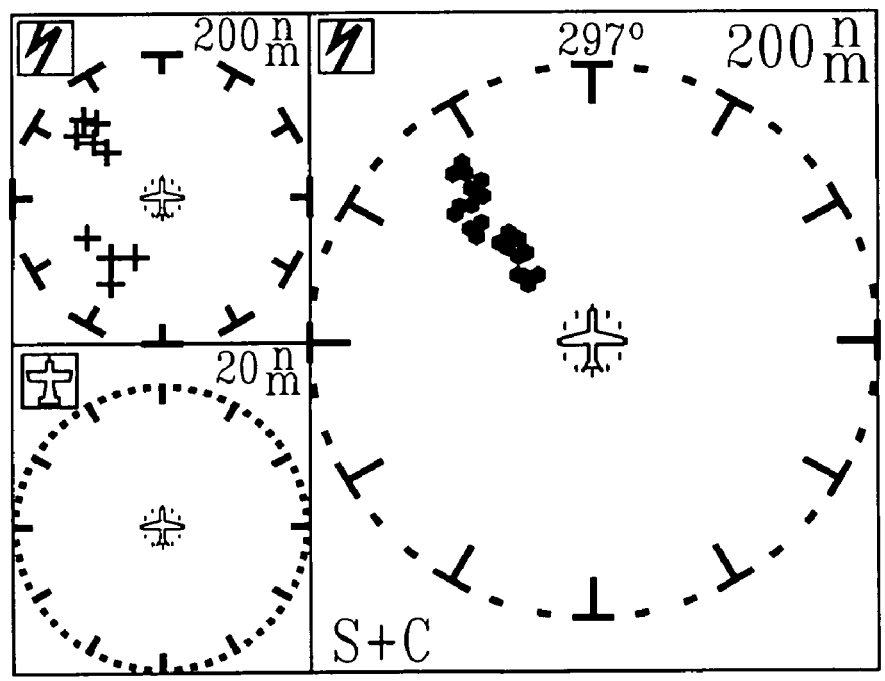

An extension of the cell mode and the flash mode is to combine the two. The flash mode provides the "raw" or discrete events, while the cell mode provides a more visually attractive, and more easily interpreted, image. In the preferred embodiment, this mode is implemented as a cell mode display with all flashes drawn as white dots. The flashes are blinked at a 0.5 Hz rate so that they are on for one second and off for one second. The sample images (FIG. 7) show the cell mode (left, large window) and the strikes overlaid on cell mode (right, large window).

Lightning Weights and Regional Effects

Because lightning can be observed originating from and terminating at a specific location, it is frequently perceived as being a pin-point event. However if lightning is considered to have a regional effect that extends for some distance around the actual event, it is possible to gain some understanding of the region of space that generated the strike. In other words, there is some region within which conditions were conducive to the build-up of static electric fields adequate to cause a lightning discharge. It is this region of unstable atmosphere that is of most importance and interest to a pilot. By combining the regional effects of numerous lightning return strokes it is possible to build a complete image of the region of unstable atmosphere that is generating the lightning.

Single-station lightning detection systems depend upon the "typical" intensity of a lightning return stroke to estimate the distance to a detected lightning event. Since no two lightning strikes are the same, there is a natural variation in the strength of the generated field, which leads to variations in estimated range. These variations cause the estimated range to vary from the actual range, and are typically referred to as radial spread. There are many methods that can help to minimize radial spread, all of which could be applied in a system based upon the concepts discussed here.

Although variations in estimated range can be quite substantial, analysis of data collected by a single-station lightning detection system have shown that despite the variation in intensity of individual return strokes, it is likely that the estimated range for the lightning will be close to the actual range. This leads to a clustering of data at ranges representative of the region of atmosphere that is generating the lightning. By combining the regional effects of each individual return stroke to determine the weight of each element of a hexagonal grid, an image can be built that clearly shows the regions of atmospheric instability.

A lightning flash is assigned a weight that is equal to the number of strikes that comprise the flash. A flash is considered to have an effect for some range from the estimated location of the event. The weight of the event will be highest at the estimated location, and will fall off with range according to some distribution curve. Various distribution curves may be used; however, a sinusoidal distribution has been shown to produce pleasing results. The weight (or effect) of a flash at a given distance from its estimated location can be determined as follows:

$$WeightAtRange = FlashWeight \cdot \left[\left(\cos\left(90° \cdot \frac{range}{MaxRange}\right) \cdot (1 - offset)\right) + offset\right]$$

Where:

Flash Weight is the weight of the flash.

WeightAtRange is the effective weight or effect of a flash at a given range.

range is the range from the estimated flash location at which you want to determine the effect of the flash.

MaxRange is the maximum range at which the flash has an effect.

offset is the magnitude of the effect at MaxRange (i.e., offset 0.4 would indicate that the effect of the flash is 40% down at MaxRange).

When constructing a grid display, the effect of every flash is added to any element of the array that falls within the range of effect. As these effects are added to the elements of the array, an image representing the regions of activity is produced.

It is worth noting that the sinusoidal weighting produces a useful side-effect. Since cos 45°=0.71, two flashes separated from one another by MaxRange will have their greatest effect halfway between the two events. This makes sense since the region of activity is not greatest at a flash, but at the center of a cluster of flashes.

Ranging of Very Close Strikes

The received magnetic field waveform of lightning has a very fast rise time, and a somewhat slower fall time. The fall time of the waveform becomes somewhat more elongated as the distance to the strike gets closer than about 15 miles due to the addition of the intermediate field (see the waveform of a 10 nmi strike in FIG. 8). Therefore the width of the initial peak of the lighting waveform gets wider the further down the waveform is measured.

Figure 8:
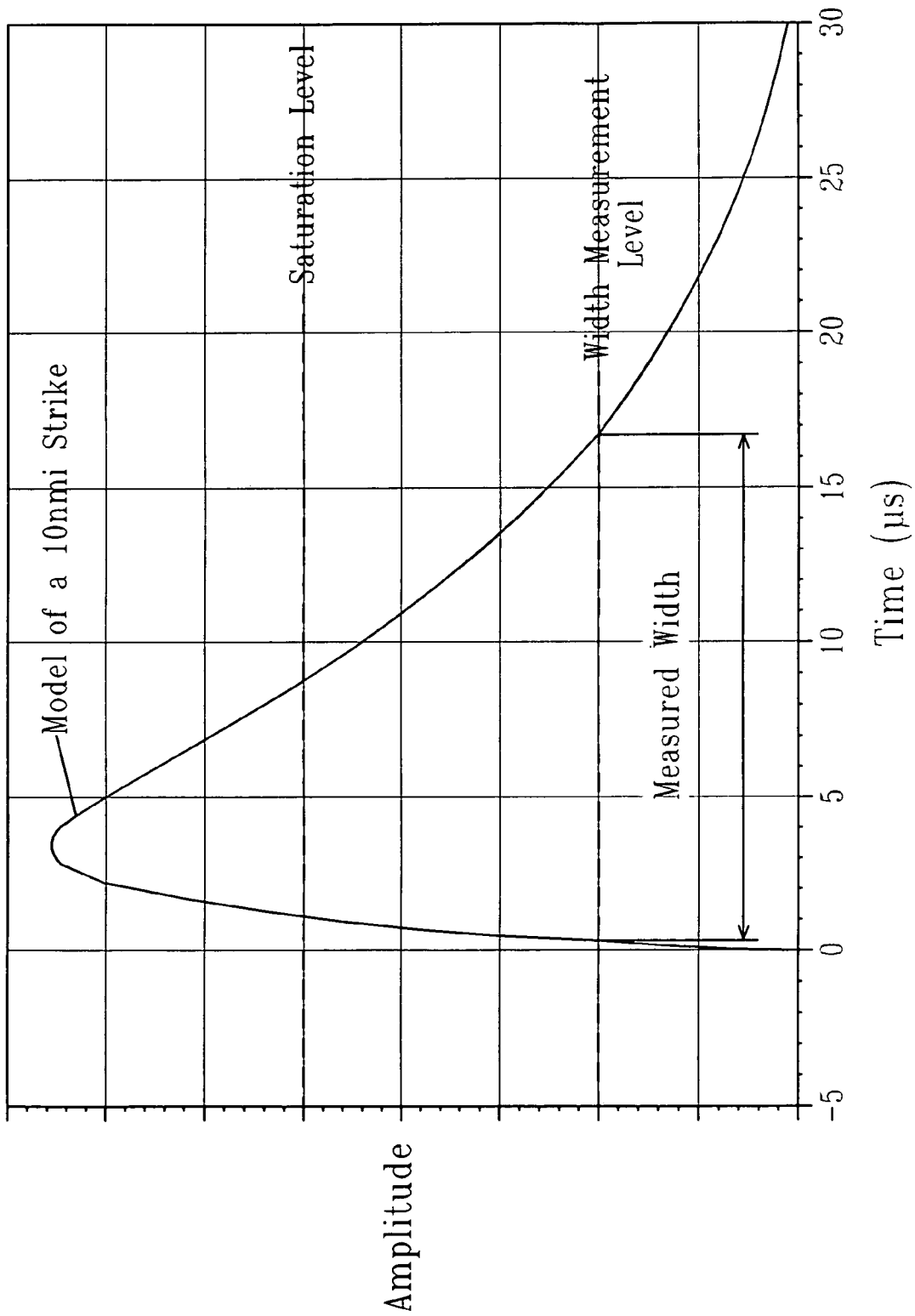
FIG. 8 shows how range may be calculated from pulse width.

Since all receivers have a finite dynamic range, there is typically a trade-off between the maximum detectable range, the resolution of the data, and the minimum detectable range. Lightning is especially challenging when trying to detect it at close range, because the signal is so large. To eliminate this problem the receiver could be designed to operate over a typical range for a single-site lightning detection system without regard to close-range signal detection. When the lightning signal saturates the receiver, it is not possible to use the peak amplitude of the signal to estimate the range. Instead, the width of the pulse is measured to estimate the range. The width is typically be measured at a fixed level so that it can be related to the width of the standard lightning model at that level. The estimated range to the strike is the range where the model has the same width at the level used for the measurement. For example, FIG. 8 shows the model of a 10 nautical mile strike. If the measured width of a saturated strike is the same as the width shown in this example, then the range to the strike is 10 nautical miles.

In addition to modifying how the range is estimated, it is also necessary to modify how the bearing is calculated for a saturated signal, since the bearing is typically calculated as the arctangent of the ratio of the horizontal and vertical loop amplitudes at the peak of the strike. Since the ratio of the horizontal and vertical loop signals is the same throughout the waveform of a lightning strike, the bearing could be measured at any point on the waveform that is not saturated. In practice, however, atmospheric reflections and other phenomena can cause the later portion of the waveform to have inconsistencies. To avoid these issues, the bearing should be measured on the rising edge of the initial waveform peak. To maximize resolution it is best to measure it as near the saturation point as practical. In some embodiments the receiver signals are sampled and digitized. In experiments it has been found that using the last digital samples of the horizontal and vertical signals where neither channel was saturated provides excellent results.

The relation between the measured width of a lightning waveform and the equivalent amplitude is determined based on a table relating these two parameters. In fact there are two different tables, for two different kinds of lightning strikes. We have found that there is a significant difference between the waveforms of cloud-to-ground lightning (C-G) and other forms of lightning (inter-cloud and cloud to air, non C-G). One aspect of that difference is that the fall time (and hence the pulse width) of non C-G lightning is significantly shorter than C-G lightning. Consequently there is a different relation between pulse width and equivalent amplitude for C-G lightning and non C-G lightning. A further difference between the waveforms for C-G lighting and non C-G lightning is the ratio of peak amplitude to overshoot amplitude. In C-G lightning, the peak is typically some multiple (at least two or greater) of the overshoot peak, whereas in the non-C-G lightning the ratio is typically around unity. Furthermore the width of non C-G lightning is usually shorter than the pulse width for C-G lightning. We test the ratio of peak and overshoot and the pulse width parameters of the waveform data and declare a pulse to be non-C-G lightning if the ratio of peak and overshoot is about unity and the pulse width is less than a threshold duration. For pulses categorized as C-G lightning we use the C-G table to relate pulse width to equivalent amplitude whereas for other pulses (non-C-G lightning) we use the non C-G table.

The only additional consideration when designing a receiver for such a system is that the receiver must be well-behaved during overload conditions. The output of the receiver should remain at maximum amplitude for the duration of signal saturation; otherwise the width measurement would be off. However as long as the output of the receiver saturates for some period, poor behavior could be detected and at least partially compensated for by simply looking at the first and last time the output saturates. The duration between these two times would be the minimum width of this event.

Audible Lightning Callouts

In commercial aircraft it is common for a crewmember to call out lightning that occurs nearby. With this in mind, it would be a useful feature for an airborne lightning detection system to call out nearby lightning events. A callout such as "Lightning! One O'clock" would provide the flight crew with immediate feedback of local conditions. The callouts would be limited to lightning detected within some range, for example 5 nautical miles. The range cutoff for audible callouts should be adequately small to prevent excessive nuisance alarms.

Since some storms can be very active, there should be some ability to limit the number of callouts. For instance, the system may limit the number of callouts provided within a certain period of time. If this threshold is exceeded, the callouts could be suppressed for a period of time. Audio suppression may also be done on a quadrant basis, where callouts for lightning occurring in a particular quadrant would be independently suppressed based upon the number/frequency of callouts due to that quadrant's activity. This would be helpful to assure that callouts from each active quadrant are heard before they are suppressed.

It should be noted that without the ability to accurately detect and map lightning at very close ranges this capability would not be practicable. With the previously described method of close-range detection and mapping, this idea becomes feasible.

Regional Statistics

It is helpful to provide the user of lightning detection equipment statistical data regarding the thunderstorm activity that is being viewed. Prior art has typically chosen to provide strike rate statistics for the visible screen, without regard for the number of areas or regions of thunderstorm activity being displayed. One region may be much stronger than another, and one region may be diminishing while another is intensifying.

Figure 9:
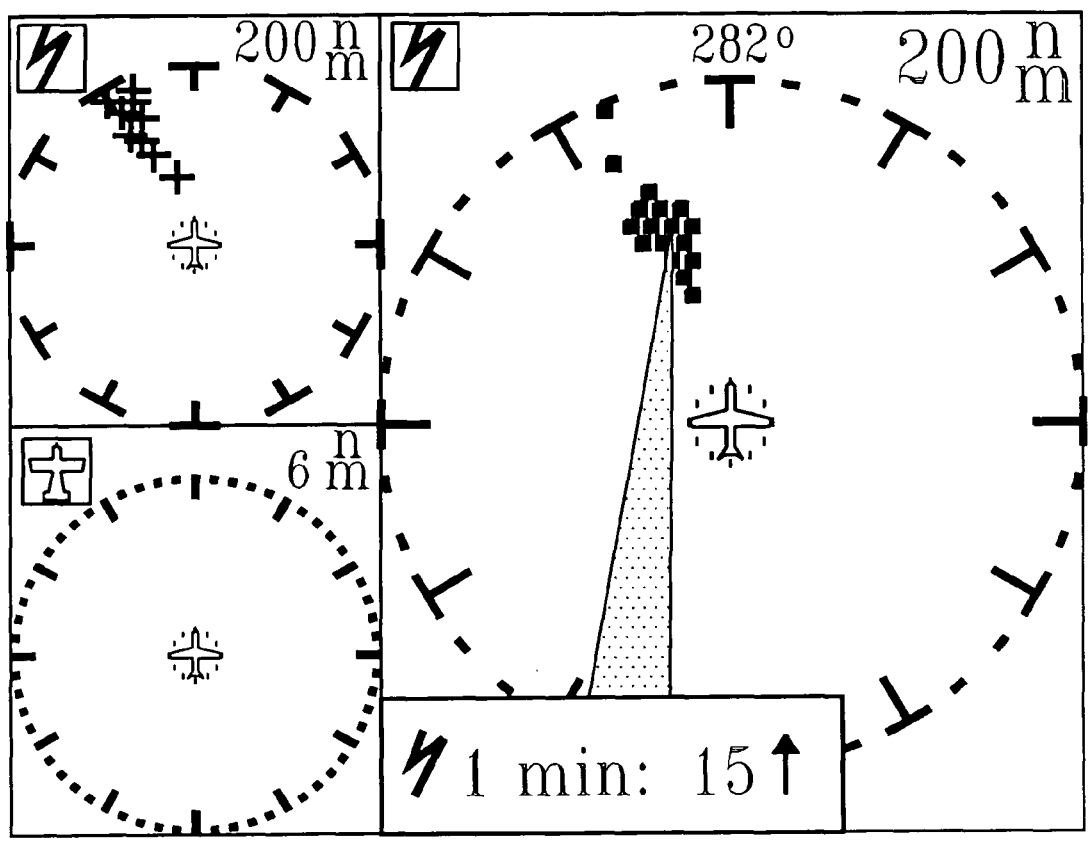
FIG. 9 is an illustration of another display mode which allows pertinent weather statistics to be selected by a user for display.

To improve upon the usefulness of the statistical data provided to the pilot, in one embodiment of the present invention the individual regions of thunderstorm activity may be identified and allows the pilot to step through the statistics for each region. An example of this method is shown in the large window of FIG. 9.

This image shows a single region with a strike rate of 15 strikes per minute. It also indicates with an up-arrow that the strike rate is increasing. It is important to note that additional statistics may be displayed such as the ratio of positive to negative strikes and the rate at which the ratio is changing. Processing to produce these statistics proceeds as follows. The data in the Cell Display Buffer 105f reveals the location of lightning activity and its relation to other locations of lightning activity. We have selected a threshold, such as the dim green index (2). We consider all adjacent cells with activity above the index 2 to be in a single region. Thus the border of any region is evidenced by an index of 2 or lower. We provide a unique designation for each region as well as a location for the region, such as the location of a cell with the highest activity in the region. The processor then determines a set of statistics for the region such as strike rate, strike rate trend (is the rate increasing or decreasing) and strike polarity. This data may then be provided to the display and displayed either unconditionally or subject to the operator selection. Referring to FIG. 1b, the strike processor 105a has access to the strike data which describes the waveform of each strike. One of the relevant parameters is the S amplitude. The polarity of this parameter defines the polarity of the strike. This data is carried forward in the Flash Assembly Queue 105b. The same data, i.e., strike polarity data is carried forward in the Flash Display Buffer 105e where the weight of the flash is the number of strikes in the flash. This data is used in computing regional statistics so strike rate, strike rate trend and strike polarity may be determined, computed and displayed.

FIG. 2 is a block diagram of the A-D converter 104. As represented in FIG. 1, the three-channel wide band receiver 102 provides three inputs to the A-D converter 104. These are provided as shown in FIG. 2 to a V loop channel ADC 211 (receiving one of the loop antenna inputs to the wide band receiver), a sense channel ADC 221 (receiving the electric field sensor input to the wide band receiver 102) and a H channel ADC 231 (receiving the other magnetic loop input). Each of the channels includes a four sample delay FIFO (212, 222 and 232) adder (214, 224, 234) and sign changer (213, 223 and 233) to produce in the registers 215, 225 and 235 a four sample sum. The four sample sum is shifted right two bits (216, 226 and 236) to generate a running average of the most recent four samples. The output 226 is a sequence of samples representing a four sample running average of the sense channel. Similar outputs 216 and 236 represent a running average of the V loop and H loop channels, respectively.

The H and the V channels also include a one sample delay (217 and 237) adder and sign changer (218-219 and 238-239). The output of 219 and 239 represents the slope of the V channel and H channel, respectively. This is simply the difference between the most recent running average and the immediately prior running average. Finally, the outputs of the shifters 216 and 236 are provided to the comparator 210 to select the maximum loop channel called Max Loop.

FIG. 2 illustrates how the six outputs of the ADC 104 are generated from its three inputs. Those six outputs are the V channel slope, the V channel running average, the sense channel (the S channel) running average, max loop, the running average of the H channel and the slope of the H channel.

The logic of the signal processor complex 105 is represented in part by the flow chart of FIGS. 3A-3F. The logic of the flow chart responds to the inputs provided by the ADC 104, a set of flags, variables and constants and the values in several programmable registers. The flags, variables and constants are defined as follows:

H=H loop average.
V=V loop average.
S=Sense channel average.
Max Loop—Greater of H or V, (Unsigned comparison)
Loop=The loop channel that is to be used to detect the zero crossing. When the Which Valid flag is not set, Loop is the same as Max Loop. When the Which Valid flag is set, Loop is the channel that the Which flag points at.
H Slope=H−Hprev.
V Slope=V−Vprev.
Hprev=The value of H during the previous sample, H[n−1].
Vprev=The value of V during the previous sample, V[n−1]
Last Loop Sign=Sign of Loop during the previous sample.
Delayed S=If S[N] is the current sample then Delayed S is S[N−6]. In other words, the S sample that is 6 samples old.
Which flag=When a strike is active, this indicates which loop channel caused the highest peak. This is latched during the first peak on the first sample that does not cause a new highest peak.
Which Valid flag=Set when the Which flag has been set.
First Peak=This is the H, V, and S amplitudes at the peak of First Peak. This may not be the literal first peak of the waveform if the literal first peak is more than 25% below the amplitude of a subsequent peak. Initial peaks that are more than 25% below the amplitude of a subsequent peak are considered leader currents.
Overshoot Peak=The H, V, and S amplitudes of the highest amplitude sample detected during the overshoot. The overshoot begins following the first zero crossing after the first peak, and continues until the second zero crossing
This Peak=The H, V, and S amplitudes of the highest amplitude sample detected during the waveform peak that is currently being received. Later, a decision will be made about whether to save This Peak as the First Peak or Overshoot Peak.
Max Peak=This is the H, V, and S amplitude of the sample that caused the highest Loop amplitude during the strike.
Duration=Number of samples comprising the strike. Includes the first sample to exceed MTL and all following samples until the end of the strike.
Recovery=Count of number of samples below ZTL. This is used to determine if the strike is finished.
Peak Time=Number of samples that loop has been above ZTL.
Strike in Progress=Flag that indicates that we are currently in the process of receiving a strike.

Peak in Progress=Flag that indicates that we are in the process of receiving a peak of the waveform.

CW Error flag=Flag used to report conditions that may impair strike detector performance. This flag should be made available for the software (of the programmable processor) to read. This flag can only be cleared by the software.

Microphone flag=Indicates that the microphone was active at some time during reception of the strike. A latched copy of this flag should be made available for the software to read The copy should not be cleared until specifically cleared by the software.

SenseZeroCross=Flag that indicates whether the sense channel has fallen back below ZTL.

LoopZeroCross=Flag that indicates whether Max Loop has fallen back to ZTL.

FirstZeroCross=Non-zero after the first zero crossing.

ZeroCrossingCount=The count of the number of zero crossings detected.

ZeroCrossDelay=The number of samples between the time that the Sense channel and Max Loop fall below ZTL. This is an unsigned value and it does not depend upon one or the other falling below ZTL first.

Peaks Before=The number of peaks before First Peak that were greater than the largest peak before it, and which were less than four times the amplitude of the largest peak preceding it. Note that Peaks Before is reset whenever a peak is found that is four times or more the amplitude of the highest peak before it.

Enable S Latch=This is a counter that counts down the number of samples following an update of This Max Peak that we check the Delayed S for a maximum peak. This compensates for the phase mismatch between the loops channels and the S channel.

The values which are obtained from programmable registers in the processor complex 105 are defined as follows:

Recovery Period=The number of samples below MTL required for a strike to be declared complete.

CW Duration=Longest strike duration that dos not cause the noise error flag to be set.

Saturation Level=At or about this level a loop channel is said to be saturated.

MTL=Minimum Trigger Level Strike processing will begin if Max Loop exceeds MTL. This level should be set low enough to detect smaller peaks that may precede the primary peak, since such smaller peaks may invalidate the strike.

RTL=Report Trigger Level. Once a strike is finished, it will not be reported unless the First Peak Max amplitude that was latched during this strike is greater than RTL.

WTL (Width Trigger Level)=level where pulse width is measured

ZTL (Zero Trigger Level)=When Max Loop is below ZTL the Peak Time counter is cleared.

Finally, definitions of a number of peak related variables are defined as follows:

H=The maximum value of H during the peak

V=The maximum value of V during the pak.

S=The maximum value of S during the peak.

Max=The maximum amplitude seen on either the H or V channel during the peak.

H Width=The number of samples that H was above WTL.

V Width=The number of samples that V was above WTL.

H Saturation Flag=Did H saturate during this peak?

V Saturation Flag=Did V saturate during this peak?

Hsat Width=The number of samples that the H channel was saturated.

Vsat Width=The number of samples that the V channel was saturated.

Rise Time=Number of samples above MTL up to and including the highest amplitude sample.

Fall Time=Number of samples following the highest amplitude sample up to the zero crossing. This count should include the first sample below zero. If a zero crossing is not detected, then this will be the number of samples from the peak to the end of the strike Up H=The H amplitude of the sample immediately preceding the highest amplitude sample.

Up V=The V amplitude of the sample immediately preceding the highest amplitude sample.

Up S=The S amplitude of the sample immediately preceding the highest amplitude sample.

Max H Slope=The maximum value of H Slope detected during the peak.

Max V Slope=The maximum value of V Slope detected during the peak

One function of signal processor complex 105 is to filter out invalid strikes from the valid signals using the six inputs from the ADC, as well as the values in the programmable registers.

For the strikes which are not filtered out, the signal processor 105 also determines a plurality of parameters to characterize the respective waveforms. As will be described these parameters are passed on for further processing.

For each apparently valid strike the signal processor complex 105 generates the following data for further processing:

Time tag: with a resolution measured in microseconds

First Peak—H amplitude and up amplitude

First Peak—V amplitude and up amplitude

First Peak—S amplitude and Max Loop

Overshoot Peak—H amplitude and Max Slope of First Peak

Overshoot Peak—V amplitude and Max Slope of First Peak

Overshoot Peak—S amplitude and Max Loop amplitude

Max Peak—H amplitude and MTL

Max Peak—V amplitude

Max Peak—S amplitude and Max Loop

First Peak—H width (# of saturated samples) and V width (# of saturated samples)

First Peak—H saturation flag, V saturation flag, H width (# of samples>WTL), V width (# of samples>WTL)

Timer Data—First Peak rise time (from ZTL to peak), First Peak fall time, total strike duration Status—Valid flag, H CW Freq. fail flag, Microphone flag, V CW Freq. fail flag, CW error flag, Peaks before count (First Peak), zero crossing count (First Peak), Zero crossing delay (# of samples between S and loop going below ZTL)

FIGS. 3A-3F shows a flow diagram of the strike detection logic of signal processor complex 105. Among other functions this logic develops much of the foregoing data. Each sample of the three channels will cause one transition through this logic. The following paragraphs narrate the flow. The amplitude comparisons in the flow diagram are unsigned comparisons, thus the maximum loop channel is the loop channel with the greatest amplitude regardless of sign. When we determine if the maximum loop channel is greater than WTL, we determine if the unsigned amplitude of the maximum loop channel is greater than WTL, and so on.

The following constants are set up in software programmable registers to permit fine-tuning of the strike detector performance without firmware changes.

MTL—Minimum Trigger Level

RTL—Report Trigger Level

WTL—Width Triggr Level

ZTL—Zero Trigger Level

CW duration—Strike detection lasting longer than this generates a noise error.

Recovery period—Signal must remain below MTL for this period to finish a strike.

Saturation Level—At or above this level, a loop channel is said to be saturated.

The values used in these registers are determined empirically and some of the values may also be dynamic, i.e., arranged to be changed under predetermined conditions.

The first thing that happens following receipt of a sample is to initialize Loop If the WhichValid flag is not set (301), the Loop is simply set to Max Loop (305). Otherwise the Which flag is used to determine which channel to set to (302-304). The Which flag indicates which of the two loop channels has a higher amplitude for this strike. For example the processor complex 105 receives information on the presence of continuous wave energy (CW), i.e., the CW error flag. On detection of the CW error flag the level of MTL and ZTL is raised by a small amount in an attempt to defeat the noise. In the absence of setting of the CW error flag, the level of MTL and ZTL may be lowered by a small amount. Adjusting the amounts by which MTL and ZTL are changed and the time delays in applying the changes allows noise to be combated.

The sign of Loop is then used to determine if a zero crossing has occurred (306). A zero crossing is detected whenever Loop changes sign (307) while the WhichValid flag is set. If a zero crossing is detected, then the Peak Time is reset to zero (309). If a peak was in progress prior to this zero crossing (310), then This Peak is inspected to determine if it should be used as Max Peak (311, 312). Any This Peak that has a higher Max than Max Peak will be used as the new Max Peak. If This Peak has a Max that is more than four times the Max of First Peak, then This Peak will be used as First Peak (314, 324). Since First Peak is cleared to zero after a strike is finished, then the first peak to be detected will automatically become the initial First Peak. The Zero Crossing Count is reset to zero every time First Peak is updated. If the Zero Crossing Count is one, then This Peak is used to update Overshoot Peak. Since Zero Crossing Count is reset to zero after First Peak is updated, the very next peak to be detected will be the overshoot peak of the Zero Crossing Count will have been incremented to 1.

The Peak Time, Duration and Recovery counters (313) are incremented at this point.

If Max Loop is less than or equal to the Zero trigger Level (ZTL) (325), then Peak Time is reset to zero (326). ZTL is set to some level below MTL to provide a more accurate measure of the rise time. Not using only the zero crossing to reset Peak Time also avoids excessively large rise times caused by a continuous low amplitude signal that precedes the initial return stroke.

A check is made whether This Peak saturated (316), if so Hsat Width of This Peak is compared to Hsat width of the First Peak (315). If larger, This Peak becomes First Peak (324). If the peak did saturate but Hsat width of This Peak is not greater than Hsat width of First Peak then the Vsat width is compared to the Vsat width of First Peak 317. If the Vsat width is greater than This Peak becomes First Peak (324), otherwise the flow is directed to check if This Peak Max>First Peak Max (318). If so, This Peak becomes the First Peak and Peaks Before is incremented (319). If not, then the Overshoot Latch is checked to see if it is clear (320). If it is then This Peak is declared to be Overshoot Peak and the Overshoot Latch is set (321). If the Overshoot Latch is not clear, then the ZeroCrossingCount is incremented and This Peak is cleared (322). Thereafter, Peak in Progress is cleared, First Zero Count is set and Duration becomes Reported Duration (323).

If the Max Loop is greater than the Minimum Trigger Level (MTL), then the Strike in Progress flag is set and the Peak in Progress flag is set (332, 333).

At this point, if there is not a strike in progress (334), then all of the basic parameters are reset to defaults and the loop is finished (335). If there is a strike in progress, then the recovery period is evaluated. If the recovery period has expired, then the strike is finished. Only strikes that have a First Peak Max that is greater than the Report Trigger Level (RTL) will be reported (337). If the Microphone flag is set (338), then the strike will only be reported if invalid strike reporting has been enabled (339). If the strike is to be reported, then a report is generated (340, 341). Referring to FIG. 1 reveals that the microphone switch 103 is another input to the receiver. The status of the microphone is a signal which is sampled and passed on to the signal processor complex 105. The switch merely repeats the status of the microphone, either at rest or in use. This allows the processor complex 105 to record this as a parameter of the strike signal. Since use of the microphone can reflect noise, we discard all strike waveforms which are received at a time when the microphone is active.

If there is a strike in progress (334) and the recovery period has not been elapsed (336), then the strike is continuing. If the microphone input is asserted, then the Microphone flag is set (343, 344). If the strike Duration is greater than CW Duration, then the CW Error flag is set (353, 354, 355). If the H loop has saturated (345), then the H Saturation flag is set (346), and if the V loop has saturated (347), then the V Saturated flag is set (348).

Since the sense channel is not necessarily in-phase with the two loop channels, we need to look for the peak of the sense channel near the peak of the loop channels (356), but it may not occur at exactly the same time. If the Enable S Latch counter is greater than zero, then we are looking for the peak of the sense channel. The Enable S Latch counter is decremented (357) and then if the current S amplitude is greater than This Peak S (360), then This Peak S is updated with the current S amplitude (361). If the S amplitude that is 6 samples old is greater than This Peak S (358), then This Peak S is updated with the value of the S amplitude that is 6 samples old (359). This process repeats for 6 cycles as the Enable S Latch counter decrements. When all is done, This Peak S will contain the maximum S amplitude that occurred within 5 samples after and 6 samples before the peak of the loop channels.

Next the Max Loop is checked to see if it is greater than This Peak Max (362). If it is, then This Peak H and This Peak V are set to the current H and V values respectively (369). This Peak S is set to zero. This Peak Max is set to Max Loop, This Peak Rise Time is updated with the value of Peak Time, This Peak Fall Time is zeroed, This Peak Time Tag is latched, and the Enable S Latch counter is initialized to 6. This Up H and This Up V are set to the H and V value of the previous sample (369).

Thereafter a determination is made as to whether First Zero Cross is clear (373). If it is then LoopZeroCross, SenseZeroCross and ZeroCrossDelay are cleared (374). If not, or after completing function 374 a determination is made as to whether H Slope is >This Peak H Slope (375). If it is not, a determination is made as to whether V Slope>This Peak V Slope (377). If either H Slope or V Slope is greater then This Peak Slope is reset to H or V Slope (376, 378).

Thereafter a determination is made as to whether First Zero Cross is clear (373). If it is then LoopZeroCross, SenseZeroCross and ZeroCrossDelay are cleared (374). If not, or after completing function 374 a determination is made as to whether H Slope is >This Peak H Slope (375). If it is not, a determination is made as to whether V Slope>This Peak V Slope (377). If either H Slope or V Slope is greater then This Peak Slope is reset to H or V Slope (376, 378).

If Max Loop is not greater than This Peak Max, then the Which Valid flag is checked (363). If it is not set, then Which is set to point at whichever loop channel currently has the greater magnitude (364-366).

Next This Peak Fall Time is incremented (367), and Which Valid is set.

If one of the two loops saturates (345, 347), then This Peak saturation flag is set and the relevant width measure is incremented (346, 348).

If H loop is greater than WTL (349), then This Peak H Width is incremented (350). If V loop is greater than WTL (351), then This Peak V Width is incremented (352).

At this point Duration is compared to CW Duration (353), if greater then a determination is made as to whether Duration>=Max Peak Max (354), if it is the CW Error Flag is set (355). If not a determination is made as to whether the Enable S Latch is greater than zero. If it is then the count is decremented (357). A determination is then made as to whether Delayed S>This Peak S (358). If it is then This Peak S becomes Delayed S (359). In either event a determination is made as to whether S>This Peak S (360). If so This Peak S becomes S (361).

A determination is made (370) as to whether This Peak Loop V saturated. If is did a check is made to determine whether H>This Peak H (371), if so This Peak H becomes H (372). If either determination is in the negative then a check is made as to whether This Peak H loop saturated (379). If it did then a check is made as to whether V>This Peak V. If so, This Peak V becomes V.

Before completing the cycle, the current H, V and sign data is stored as the previous data (382) and the process repeated.

Loop carrier wave detector logic is implemented as follows. This logic is duplicated for the two loop channels. X Loop refers to the loop channel amplitude for the channel that the logic is applied to. The logic runs in parallel with and independeht of the logic of FIGS. 3A-3F except that the strike frequency fail flag is reported in the strike record, and is cleared at the end of strike detection. The following variables are used in this logic:
 i. Period: Number of samples in one-half cycle of a CW signal. This is the number of samples between the point that the waveform exceeds ZTL on opposite sides of a zero crossing.
 ii. Cutoff: This is the number of samples in half a period of the highest valid frequency. Fewer samples than this is an indication that the frequency is too high.
 iii. Bad Frequency Count: Number of times the half-period measurement of the frequency indicated that the frequency is too high.
 iv. Fail Limit: If Bad Frequency Count is above this it will set the Frequency Fail Flag.
 v. Frequency Fail Flag: Indicates that high frequency carrier wave is present.

Strike Frequency Fail Flag: Indicates that a high frequency carrier wave was detected at some time during the current strike in progress.

The signal processor complex 105 determines for each strike, values for First Peak, Overshoot Peak, Max Peak, Up Amplitude, Timer and Counters Status and a Check Sum. With this information, the further processing effects three major functions. In the first place, it continues the filtering of invalid strikes. In addition, it determines, for each strike which passes the various tests, an estimated bearing and range. If the strike does not exhibit any saturation in either loop, the range is determined from the Max Peak. Also absent saturation, bearing is determined from the ratio of the H and V Peaks. If one of the channels does saturate during the strike, then neither of these methods can be used. In the event of saturation, the relevant pulse width (H or V) depending on which channel became saturated is used. The width value allows a determination to be made of an equivalent amplitude. Based on the equivalent amplitude, a range can be calculated for the strike. Recall that the relation between pulse width and equivalent amplitude depends on the categorization of the lightning as C-G or non C-G. We have described the tests used to distinguish C-G lightning from non C-G lightning and how the result of the test is used to select the appropriate table so that the proper equivalent amplitude can be determined from the pulse width. The presence of saturation also makes it impossible to use the bearing determination as a ratio of the H and V peaks. Rather, in lieu of the peak amplitude for the bearing determination, the up amplitude for both loops are extracted and the ratio establishes the desired bearing. Having determined range and bearing for each strike, the processor can then determine the weight to be given to different regions in the relevant space based on the presence and distribution to the strikes. The strikes, located with their range and bearing (and time of receipt) will then be incorporated into a flash, alone if there are no related strikes, otherwise melded with other strikes which are adjacent in time and space.

Strike Rejections

Figure 10:
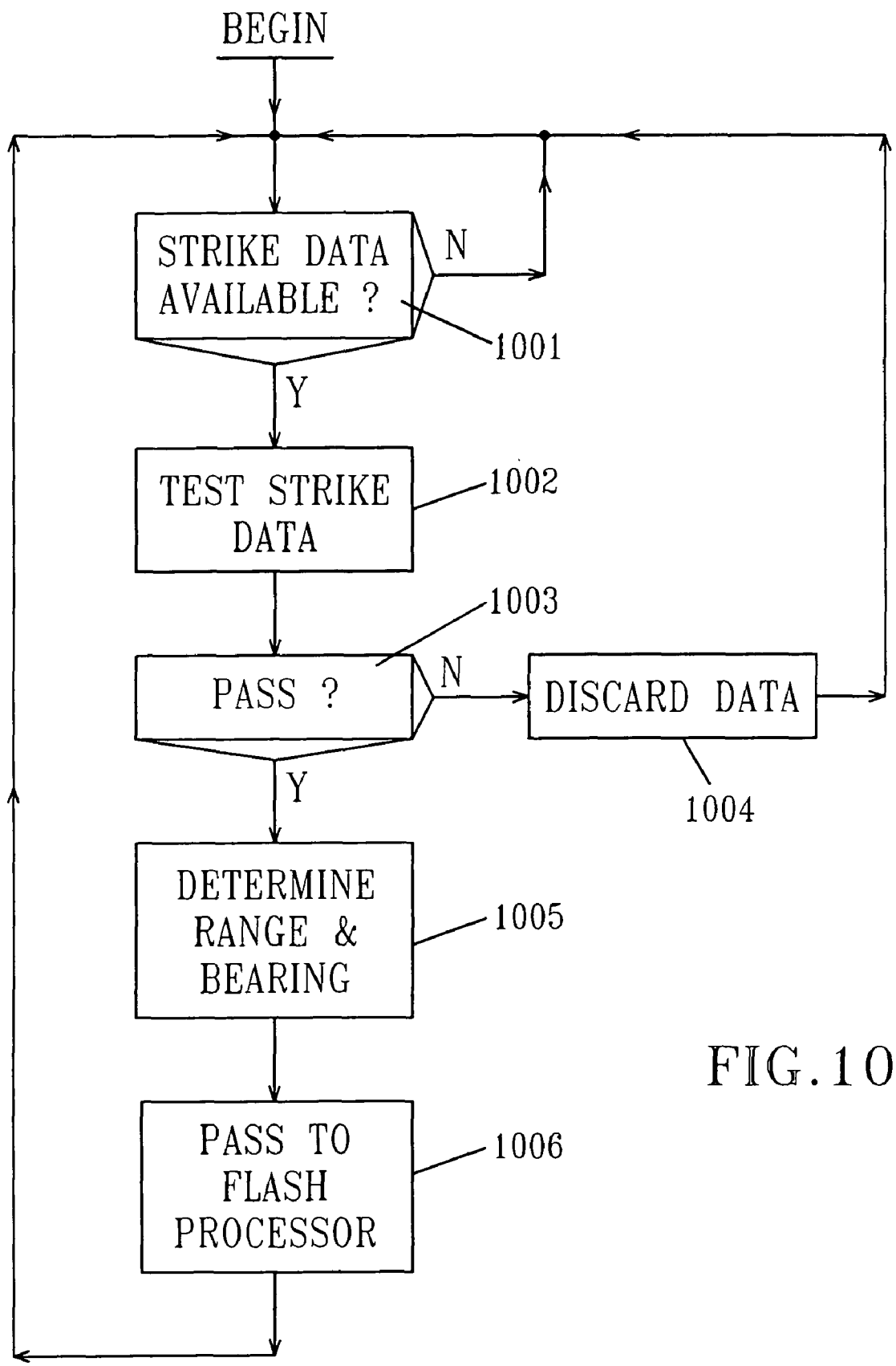
FIG. 10 is a flow diagram of functions performed by the programmable processor preparatory to flash processing.

FIG. 10 shows the strike rejection functions of the processor complex 105. The initial function 101 determines if strike data is available. If not, the processor loops waiting for new strike data. If there is new strike data, function 1002 applies a number of tests to the strike data.

The software in the processor complex 105 uses the following criteria:

A strike which has a rise time which is greater than a determined amount is an indication of a man-made signal, atmospheric reflection or some other interference. In a system which used a clock rate of 33 MHz and a sample rate of 33/16 Mhz, the rise time requirement was less than about 21 samples. i.e., less than about 10-12 microseconds.

Valid strikes show a correlation between the signals generated by the loop and sense antennas. The processor complex 105 has available to it Sense Loop and Max Loop. The criteria used is that the amplitude of the sense channel show at least three quarters of the Max Loop amplitude, but no more than three times the Max Loop amplitude.

The next criteria is that the parameter "Peaks Before" must be zero. There may not be any peaks more than one quarter of the maximum measured peak prior to the Max Peak.

The magnitude of the Overshoot Peak of S must be less than or equal to 110% of the magnitude of the First Peak S.

The Max Peak Loop magnitude must be less than or equal to 110% of the First Peak Max Loop magnitude.

The strike duration must be less than a pre-determined time. In an embodiment where the sample rare was 2.0625 M amples per sec., the allowable duration must be less than 2000 samples.

Zero plus delay between the sense and the max loop channel is checked. The time duration cross (for example measured in terms of samples) between the max loop channel reaching zero compared to a sense channel magnitude reaching zero must be no more than a pre-determined amount.

There should be no continuous wave frequency measured during the lightning active time, which is more than 57 khz above the ZTL.

Finally, the check sum is to verify the data in the record is current. If not, the record is discarded. Although we believe that this set of strike rejection criteria fulfills our goals for providing an useful display to the pilot it is apparent those skilled in the art will be able to vary some of the parameters of one or more of these criteria or add to the criteria to suit particular situations within the spirit of the invention.

Figure 11:
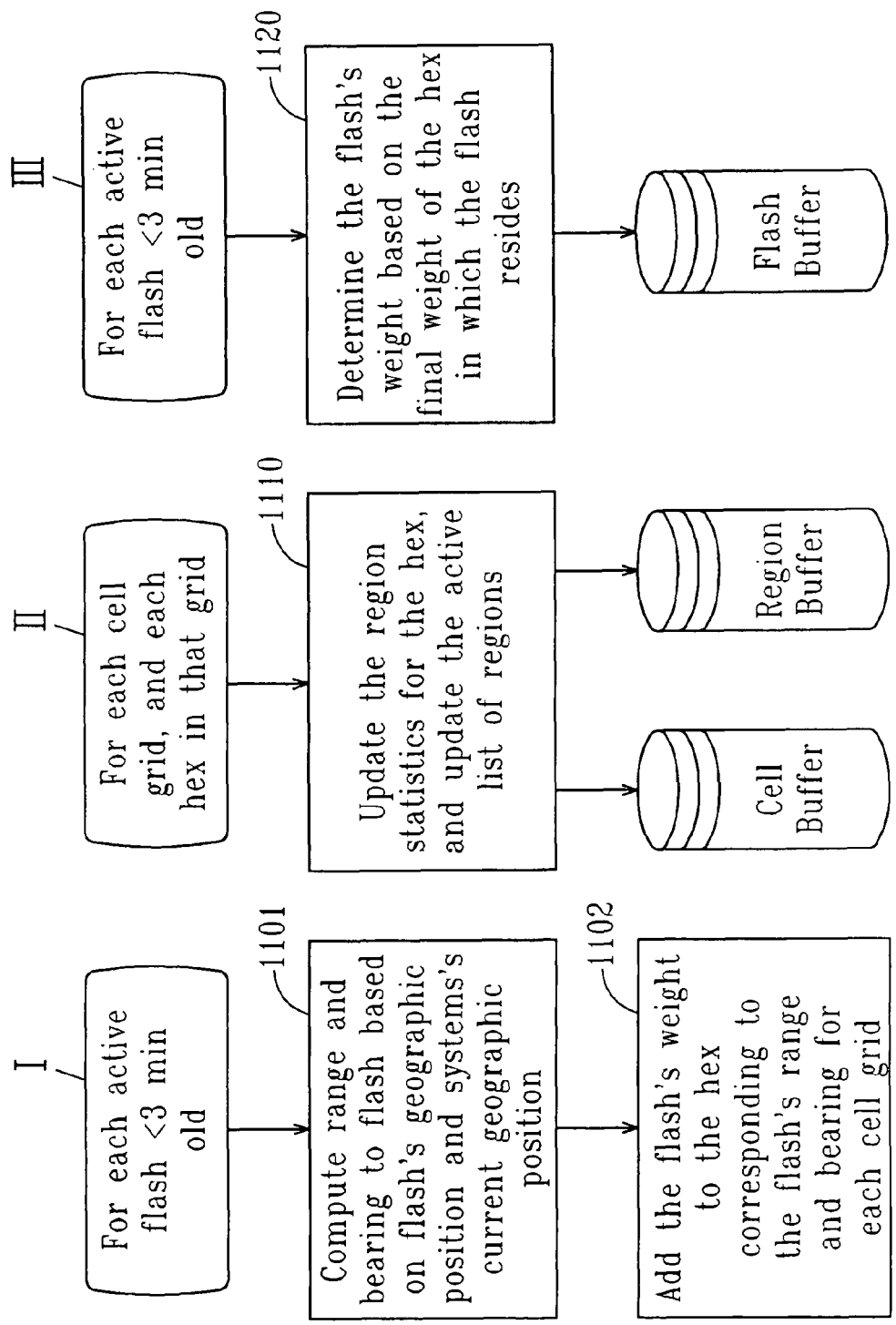
FIG. 11 is a diagram illustrating further processes of the programmable processor.
Figure 12:
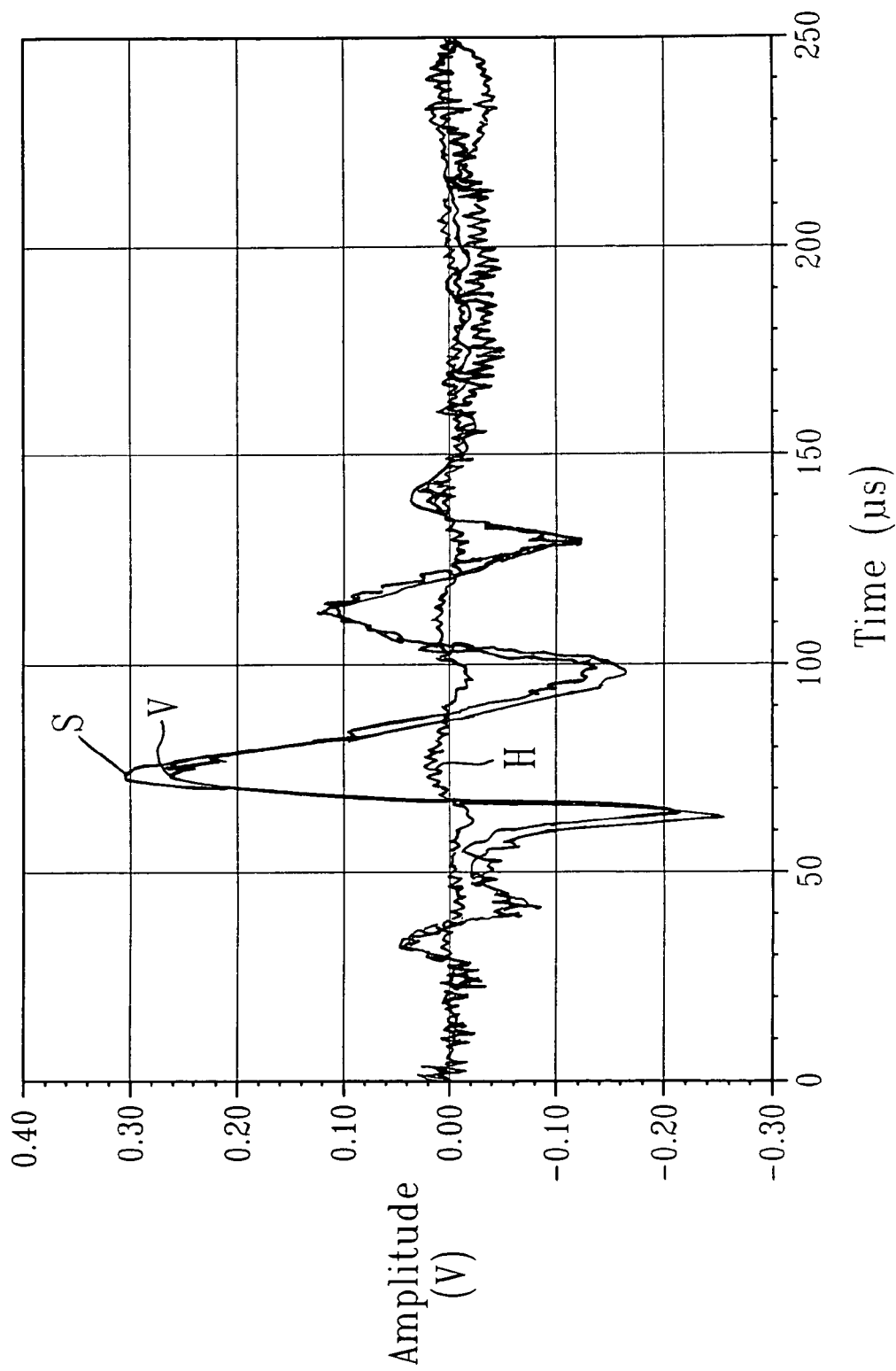
FIG. 12 shows waveforms of three signals typical of lightning originated signals which are well correlated.
Figure 13:
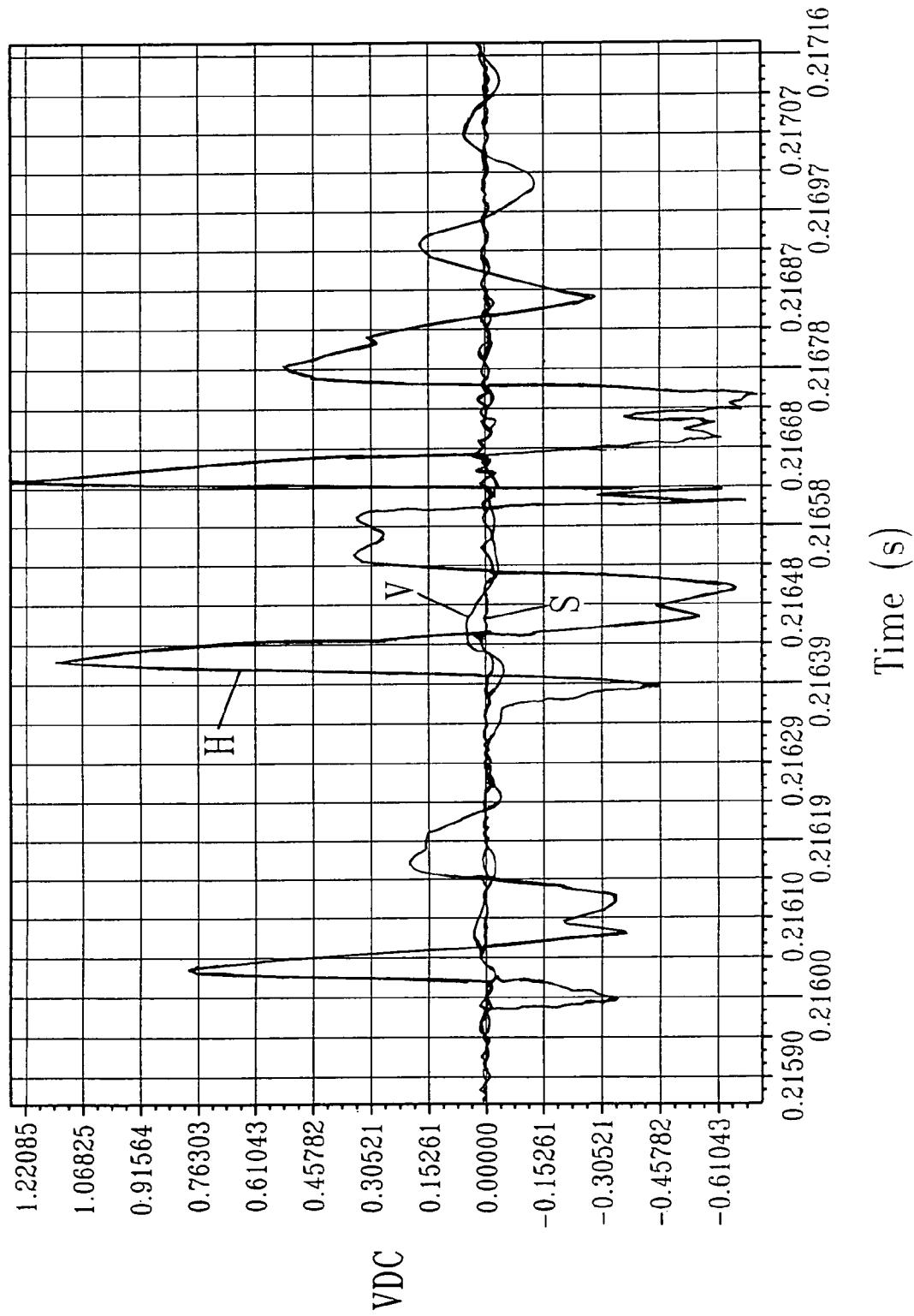
FIG. 13 shows three waveforms having some similarity to the waveforms of FIG. 12 but which are not correlated.
Figure 14:
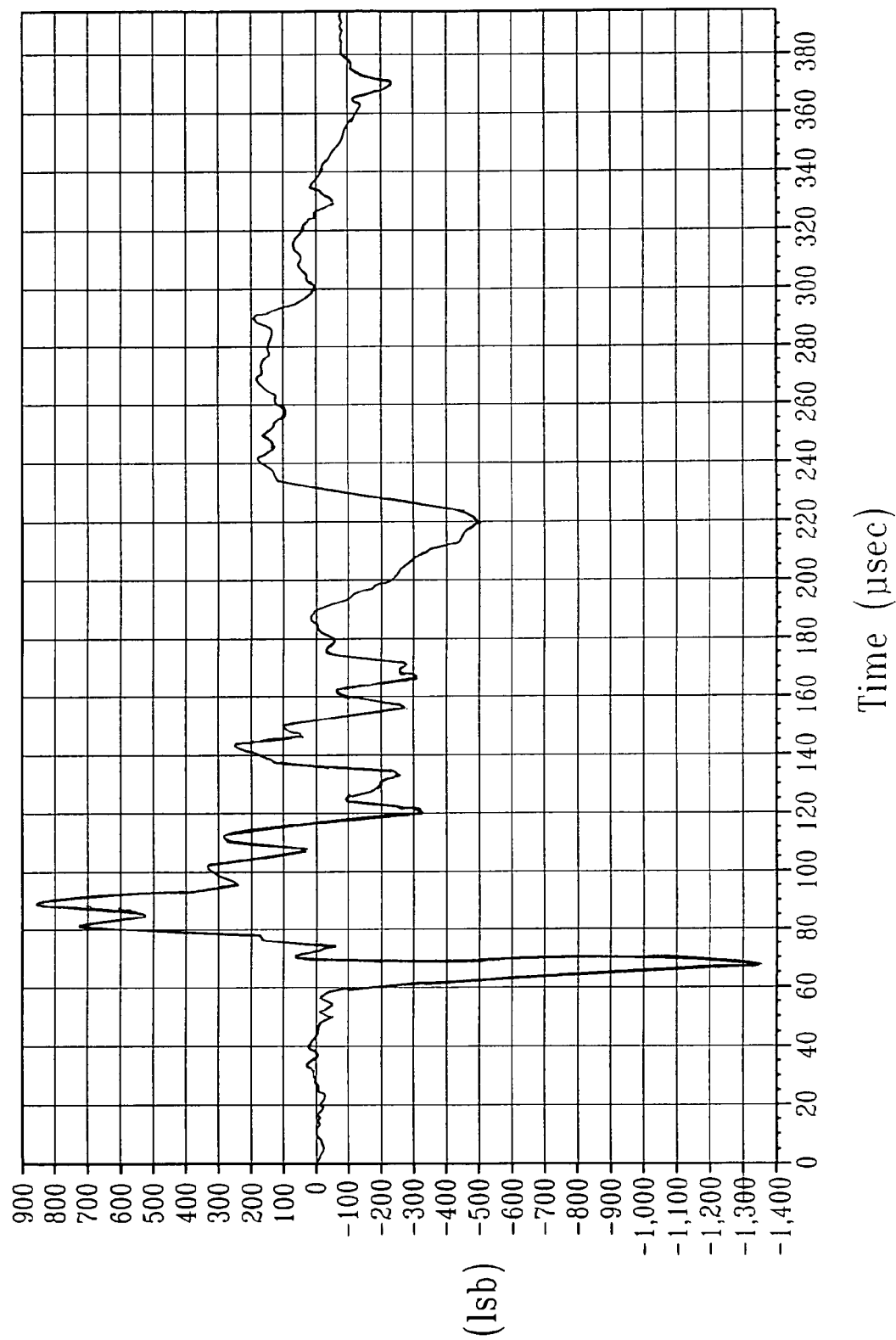
FIG. 14 is a lightning originated waveform which has had its range extended by being channeled.

Further processing carried out by the processor complex 105 is illustrated in the flow diagram of FIG. 11. FIG. 11 shows three different threads, two (I and III) show functions performed for each active flash which is less than 3 minutes in age, and the third (II) for each location in the arrays associated with the displays. In one embodiment of the invention flashes older than 3 minutes are not displayed.

The processor complex 105 stores an array of cells for each different range scale that may be displayed (see Cell Display Buffer, 105*e* in FIG. 1*b*). In one embodiment the operator may select from five different range scales, one displaying a 200 nmi max range, another with a 100 nmi max range, a third with a 50 nmi max range, a fourth with a 25 nmi max range, and a fifth 10 nmi range. The display for each range scale has a predetermined number of hexagonal elements to show the selected region, typically each range scale has the same number of elements; in one embodiment there are approximately 1900 cells per range scale. Thus the processor stores five arrays, each with approximately 1900 locations. The data stored in these locations will now be described.

The first thread I has two functions. In function 1101 the processor computes the range and bearing to the flash based on the location of the flash and the current location of the vehicle supporting the equipment. Recall that function 1005 (FIG. 10) had determined the range and bearing of the strike when the data was accepted by the processor complex 105. The range and bearing determined at that time (when function 1005 is performed) is used, in connection with flash processing to determine the geographic position of the flash based on the geographic position of the system when the strikes making up the flash was detected. Function 1101 determines a current range and bearing to the flash based on the geographic position of the flash and a more current position of the system. Given the flash's location and its weight (number of strikes), the processor determines which of the elements in each array are affected by the flash and the amount of the effect. When this process is repeated for each active flash then each of the arrays has had its data made current and is available for display.

Given the weight for each hexagonal element, it is then necessary to develop an index value which is used to select the color for that hex element. There is a different table for each different range scale (200 nmi, 100 nmi, 50 nmi, 25 nmi and 10 nmi). For a given range scale an array is developed which stores a color index for each cell of that array. The color index is obtained from the table related to the range scale. The five tables are reproduced below:

200 nmi table:

| //  | 0  | 1  | 2  | 3  | 4  | 5  | 6  | 7  | 8  | 9  | A  | B  | C  | D  | E  | F  |      |
|-----|----|----|----|----|----|----|----|----|----|----|----|----|----|----|----|----|------|
| 0,  | 1, | 1, | 1, | 1, | 2, | 2, | 3, | 3, | 4, | 4, | 5, | 5, | 6, | 6, | 6, |    | // 0 |
| 6,  | 7, | 7, | 7, | 7, | 7, | 7, | 7, | 7, | 7, | 7, | 7, | 7, | 7, | 7, | 7, |    | // 1 |
| 7,  | 7, | 7, | 7, | 7, | 7, | 7, | 7, | 7, | 7, | 7, | 7, | 7, | 7, | 7, | 7, |    | // 2 |
| 7,  | 7, | 7, | 7, | 7, | 7, | 7, | 7, | 7, | 7, | 7, | 7, | 7, | 7, | 7, | 7, |    | // 3 |
| 7,  | 7, | 7, | 7, | 7, | 7, | 7, | 7, | 7, | 7, | 7, | 7, | 7, | 7, | 7, | 7, |    | // 4 |
| 7,  | 7, | 7, | 7, | 7, | 7, | 7, | 7, | 7, | 7, | 7, | 7, | 7, | 7, | 7, | 7, |    | // 5 |
| 7,  | 7, | 7, | 7, | 7, | 7, | 7, | 7, | 7, | 7, | 7, | 7, | 7, | 7, | 7, | 7, |    | // 6 |
| 7,  | 7, | 7, | 7, | 7, | 7, | 7, | 7, | 7, | 7, | 7, | 7, | 7, | 7, | 7, | 7, |    | // 7 |
| 7,  | 7, | 7, | 7, | 7, | 7, | 7, | 7, | 7, | 7, | 7, | 7, | 7, | 7, | 7, | 7, |    | // 8 |
| 7,  | 7, | 7, | 7, | 7, | 7, | 7, | 7, | 7, | 7, | 7, | 7, | 7, | 7, | 7, | 7, |    | // 9 |
| 7,  | 7, | 7, | 7, | 7, | 7, | 7, | 7, | 7, | 7, | 7, | 7, | 7, | 7, | 7, | 7, |    | // A |
| 7,  | 7, | 7, | 7, | 7, | 7, | 7, | 7, | 7, | 7, | 7, | 7, | 7, | 7, | 7, | 7, |    | // B |
| 7,  | 7, | 7, | 7, | 7, | 7, | 7, | 7, | 7, | 7, | 7, | 7, | 7, | 7, | 7, | 7, |    | // C |
| 7,  | 7, | 7, | 7, | 7, | 7, | 7, | 7, | 7, | 7, | 7, | 7, | 7, | 7, | 7, | 7, |    | // D |
| 7,  | 7, | 7, | 7, | 7, | 7, | 7, | 7, | 7, | 7, | 7, | 7, | 7, | 7, | 7, | 7, |    | // E |
| 7,  | 7, | 7, | 7, | 7, | 7, | 7, | 7, | 7, | 7, | 7, | 7, | 7, | 7, | 7, | 8, |    | // F |

100 nmi table:

| //  | 0  | 1  | 2  | 3  | 4  | 5  | 6  | 7  | 8  | 9  | A  | B  | C  | D  | E  | F  |      |
|-----|----|----|----|----|----|----|----|----|----|----|----|----|----|----|----|----|------|
| 0,  | 1, | 1, | 1, | 2, | 2, | 3, | 3, | 4, | 4, | 5, | 5, | 6, | 6, | 6, | 6, |    | // 0 |
| 6,  | 7, | 7, | 7, | 7, | 7, | 7, | 7, | 7, | 7, | 7, | 7, | 7, | 7, | 7, | 7, |    | // 1 |
| 7,  | 7, | 7, | 7, | 7, | 7, | 7, | 7, | 7, | 7, | 7, | 7, | 7, | 7, | 7, | 7, |    | // 2 |
| 7,  | 7, | 7, | 7, | 7, | 7, | 7, | 7, | 7, | 7, | 7, | 7, | 7, | 7, | 7, | 7, |    | // 3 |
| 7,  | 7, | 7, | 7, | 7, | 7, | 7, | 7, | 7, | 7, | 7, | 7, | 7, | 7, | 7, | 7, |    | // 4 |
| 7,  | 7, | 7, | 7, | 7, | 7, | 7, | 7, | 7, | 7, | 7, | 7, | 7, | 7, | 7, | 7, |    | // 5 |
| 7,  | 7, | 7, | 7, | 7, | 7, | 7, | 7, | 7, | 7, | 7, | 7, | 7, | 7, | 7, | 7, |    | // 6 |
| 7,  | 7, | 7, | 7, | 7, | 7, | 7, | 7, | 7, | 7, | 7, | 7, | 7, | 7, | 7, | 7, |    | // 7 |
| 7,  | 7, | 7, | 7, | 7, | 7, | 7, | 7, | 7, | 7, | 7, | 7, | 7, | 7, | 7, | 7, |    | // 8 |
| 7,  | 7, | 7, | 7, | 7, | 7, | 7, | 7, | 7, | 7, | 7, | 7, | 7, | 7, | 7, | 7, |    | // 9 |
| 7,  | 7, | 7, | 7, | 7, | 7, | 7, | 7, | 7, | 7, | 7, | 7, | 7, | 7, | 7, | 7, |    | // A |
| 7,  | 7, | 7, | 7, | 7, | 7, | 7, | 7, | 7, | 7, | 7, | 7, | 7, | 7, | 7, | 7, |    | // E |
| 7,  | 7, | 7, | 7, | 7, | 7, | 7, | 7, | 7, | 7, | 7, | 7, | 7, | 7, | 7, | 7, |    | // C |
| 7,  | 7, | 7, | 7, | 7, | 7, | 7, | 7, | 7, | 7, | 7, | 7, | 7, | 7, | 7, | 7, |    | // D |
| 7,  | 7, | 7, | 7, | 7, | 7, | 7, | 7, | 7, | 7, | 7, | 7, | 7, | 7, | 7, | 7, |    | // E |
| 7,  | 7, | 7, | 7, | 7, | 7, | 7, | 7, | 7, | 7, | 7, | 7, | 7, | 7, | 7, | 8, |    | // F |

50 nmi table:

| //  | 0  | 1  | 2  | 3  | 4  | 5  | 6  | 7  | 8  | 9  | A  | B  | C  | D  | E  | F  |      |
|-----|----|----|----|----|----|----|----|----|----|----|----|----|----|----|----|----|------|
| 0,  | 1, | 2, | 3, | 3, | 4, | 4, | 4, | 5, | 5, | 5, | 5, | 6, | 6, | 6, | 6, |    | // 0 |
| 6,  | 7, | 7, | 7, | 7, | 7, | 7, | 7, | 7, | 7, | 7, | 7, | 7, | 7, | 7, | 7, |    | // 1 |
| 7,  | 7, | 7, | 7, | 7, | 7, | 7, | 7, | 7, | 7, | 7, | 7, | 7, | 7, | 7, | 7, |    | // 2 |
| 7,  | 7, | 7, | 7, | 7, | 7, | 7, | 7, | 7, | 7, | 7, | 7, | 7, | 7, | 7, | 7, |    | // 3 |

-continued

| 7, | 7, | 7, | 7, | 7, | 7, | 7, | 7, | 7, | 7, | 7, | 7, | 7, | 7, | 7, | 7, | // 4 |
|---|---|---|---|---|---|---|---|---|---|---|---|---|---|---|---|---|
| 7, | 7, | 7, | 7, | 7, | 7, | 7, | 7, | 7, | 7, | 7, | 7, | 7, | 7, | 7, | 7, | // 5 |
| 7, | 7, | 7, | 7, | 7, | 7, | 7, | 7, | 7, | 7, | 7, | 7, | 7, | 7, | 7, | 7, | // 6 |
| 7, | 7, | 7, | 7, | 7, | 7, | 7, | 7, | 7, | 7, | 7, | 7, | 7, | 7, | 7, | 7, | // 7 |
| 7, | 7, | 7, | 7, | 7, | 7, | 7, | 7, | 7, | 7, | 7, | 7, | 7, | 7, | 7, | 7, | // 8 |
| 7, | 7, | 7, | 7, | 7, | 7, | 7, | 7, | 7, | 7, | 7, | 7, | 7, | 7, | 7, | 7, | // 9 |
| 7, | 7, | 7, | 7, | 7, | 7, | 7, | 7, | 7, | 7, | 7, | 7, | 7, | 7, | 7, | 7, | // A |
| 7, | 7, | 7, | 7, | 7, | 7, | 7, | 7, | 7, | 7, | 7, | 7, | 7, | 7, | 7, | 7, | // B |
| 7, | 7, | 7, | 7, | 7, | 7, | 7, | 7, | 7, | 7, | 7, | 7, | 7, | 7, | 7, | 7, | // C |
| 7, | 7, | 7, | 7, | 7, | 7, | 7, | 7, | 7, | 7, | 7, | 7, | 7, | 7, | 7, | 7, | // D |
| 7, | 7, | 7, | 7, | 7, | 7, | 7, | 7, | 7, | 7, | 7, | 7, | 7, | 7, | 7, | 7, | // E |
| 7, | 7, | 7, | 7, | 7, | 7, | 7, | 7, | 7, | 7, | 7, | 7, | 7, | 7, | 7, | 8, | // F |

25 nmi table:

| // | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0, | 1, | 2, | 3, | 3, | 4, | 4, | 4, | 5, | 5, | 5, | 5, | 6, | 6, | 6, | 6, | // 0 |
| 6, | 7, | 7, | 7, | 7, | 7, | 7, | 7, | 7, | 7, | 7, | 7, | 7, | 7, | 7, | 7, | // 1 |
| 7, | 7, | 7, | 7, | 7, | 7, | 7, | 7, | 7, | 7, | 7, | 7, | 7, | 7, | 7, | 7, | // 2 |
| 7, | 7, | 7, | 7, | 7, | 7, | 7, | 7, | 7, | 7, | 7, | 7, | 7, | 7, | 7, | 7, | // 3 |
| 7, | 7, | 7, | 7, | 7, | 7, | 7, | 7, | 7, | 7, | 7, | 7, | 7, | 7, | 7, | 7, | // 4 |
| 7, | 7, | 7, | 7, | 7, | 7, | 7, | 7, | 7, | 7, | 7, | 7, | 7, | 7, | 7, | 7, | // 5 |
| 7, | 7, | 7, | 7, | 7, | 7, | 7, | 7, | 7, | 7, | 7, | 7, | 7, | 7, | 7, | 7, | // 6 |
| 7, | 7, | 7, | 7, | 7, | 7, | 7, | 7, | 7, | 7, | 7, | 7, | 7, | 7, | 7, | 7, | // 7 |
| 7, | 7, | 7, | 7, | 7, | 7, | 7, | 7, | 7, | 7, | 7, | 7, | 7, | 7, | 7, | 7, | // 8 |
| 7, | 7, | 7, | 7, | 7, | 7, | 7, | 7, | 7, | 7, | 7, | 7, | 7, | 7, | 7, | 7, | // 9 |
| 7, | 7, | 7, | 7, | 7, | 7, | 7, | 7, | 7, | 7, | 7, | 7, | 7, | 7, | 7, | 7, | // A |
| 7, | 7, | 7, | 7, | 7, | 7, | 7, | 7, | 7, | 7, | 7, | 7, | 7, | 7, | 7, | 7, | // B |
| 7, | 7, | 7, | 7, | 7, | 7, | 7, | 7, | 7, | 7, | 7, | 7, | 7, | 7, | 7, | 7, | // C |
| 7, | 7, | 7, | 7, | 7, | 7, | 7, | 7, | 7, | 7, | 7, | 7, | 7, | 7, | 7, | 7, | // D |
| 7, | 7, | 7, | 7, | 7, | 7, | 7, | 7, | 7, | 7, | 7, | 7, | 7, | 7, | 7, | 7, | // E |
| 7, | 7, | 7, | 7, | 7, | 7, | 7, | 7, | 7, | 7, | 7, | 7, | 7, | 7, | 7, | 8, | // F |

10 nmi table:

| // | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0, | 1, | 2, | 3, | 3, | 4, | 4, | 4, | 5, | 5, | 5, | 5, | 6, | 6, | 6, | 6, | // 0 |
| 6, | 7, | 7, | 7, | 7, | 7, | 7, | 7, | 7, | 7, | 7, | 7, | 7, | 7, | 7, | 7, | // 1 |
| 7, | 7, | 7, | 7, | 7, | 7, | 7, | 7, | 7, | 7, | 7, | 7, | 7, | 7, | 7, | 7, | // 2 |
| 7, | 7, | 7, | 7, | 7, | 7, | 7, | 7, | 7, | 7, | 7, | 7, | 7, | 7, | 7, | 7, | // 3 |
| 7, | 7, | 7, | 7, | 7, | 7, | 7, | 7, | 7, | 7, | 7, | 7, | 7, | 7, | 7, | 7, | // 4 |
| 7, | 7, | 7, | 7, | 7, | 7, | 7, | 7, | 7, | 7, | 7, | 7, | 7, | 7, | 7, | 7, | // 5 |
| 7, | 7, | 7, | 7, | 7, | 7, | 7, | 7, | 7, | 7, | 7, | 7, | 7, | 7, | 7, | 7, | // 6 |
| 7, | 7, | 7, | 7, | 7, | 7, | 7, | 7, | 7, | 7, | 7, | 7, | 7, | 7, | 7, | 7, | // 7 |
| 7, | 7, | 7, | 7, | 7, | 7, | 7, | 7, | 7, | 7, | 7, | 7, | 7, | 7, | 7, | 7, | // 8 |
| 7, | 7, | 7, | 7, | 7, | 7, | 7, | 7, | 7, | 7, | 7, | 7, | 7, | 7, | 7, | 7, | // 9 |
| 7, | 7, | 7, | 7, | 7, | 7, | 7, | 7, | 7, | 7, | 7, | 7, | 7, | 7, | 7, | 7, | // A |
| 7, | 7, | 7, | 7, | 7, | 7, | 7, | 7, | 7, | 7, | 7, | 7, | 7, | 7, | 7, | 7, | // B |
| 7, | 7, | 7, | 7, | 7, | 7, | 7, | 7, | 7, | 7, | 7, | 7, | 7, | 7, | 7, | 7, | // C |
| 7, | 7, | 7, | 7, | 7, | 7, | 7, | 7, | 7, | 7, | 7, | 7, | 7, | 7, | 7, | 7, | // D |
| 7, | 7, | 7, | 7, | 7, | 7, | 7, | 7, | 7, | 7, | 7, | 7, | 7, | 7, | 7, | 7, | // E |
| 7, | 7, | 7, | 7, | 7, | 7, | 7, | 7, | 7, | 7, | 7, | 7, | 7, | 7, | 7, | 8, | // F |

Each table stores 256 color index values. The weight for any cell is the index into the table. Applying the index to the table selects one value in the table which is the color index corresponding to that particular weight and range scale. The data is stored in the cell display buffer.

As previously indicated, the data in the Cell. Display Buffer 105f reveals the location of lightning activity and its relation to other locations of lightning activity. We have selected a threshold, such as the dim green index (2). We consider all adjacent cells with activity above the index 2 to be in a single region. Thus the border of any region is evidenced by an index of 2 or lower. We provide a unique designation for each region as well as a location for the region, such as the location of a cell with the highest activity in the region. The processor then determines a set of statistics for the region such as strike rate, strike rate trend (is the rate increasing or decreasing) and strike polarity. This data may then be provided to the display and displayed either unconditionally or subject to the operator selection.

The third thread (III) Provides data for flash display. As we have noted we believe that it is desirable to display colored flashes. Thread III produces the necessary data. In particular, for each flash found in the flash buffer we determine the weight (activity) for the corresponding hexagonal element in which the flash is found. This index is written to the Flash Buffer so that on a Flash display each flash may take on that color indicated by the weight found in the corresponding Cell buffer.

Finally when we de-emphasize activity of lower weights to allow the user to focus in on higher weight activity we may need to alert the user to lower weight activity if it is sufficiently close in. To this end the Cell Display Buffers for the 200, 100 and 50 nmi range scales are associated with an alert message (typically to be presented visually on a display but in some cases this may be augmented or replaced by another mode of alert) to the effect that there is moderate activity on a 25 nmi scale or smaller.

While the foregoing specification describes specific characteristics of a preferred embodiment of the invention, those skilled in the art will understand that the scope of the invention is to be understood by the claims attached hereto and should not be limited by the specific characteristics which are described by way of example and not by way of limitation.

What is claimed as new and desired to be protected by Letters Patent of the United States is:

1. A system for detecting lightning activity comprising:
   a receiver for detecting energy emitted by lightning strikes, and
   processor means for processing signals from the receiver:
      for estimating locations of detected lightning strikes relative to the system,
      for determining a cumulative effect, on a plurality of locations arranged in a regular array, of plural lightning strikes spaced in distance from each other and from the locations and spaced in time from each other, and
      for generating display signals to illustrate said cumulative effect.

2. A vehicle carried system as recited in claim 1 wherein said receiver is a single, multiple channel receiver.

3. The vehicle carried system of claim 2 located on an aircraft.

4. The system of claim 1 wherein the regular array comprises a grid of hexagonal elements.

5. The system of claim 4 wherein the display signals illustrate said cumulative effect within a selectable display region and wherein a hexagonal element of the array is assigned a color based on intensity of the determined cumulative effect for that particular hexagonal element.

6. The system of claim 5 wherein the color assigned to a hexagonal element is based on the intensity of the cumulative effect and a selected range scale of a related display.

7. The system of claim 5 wherein different colors, ranging from dark to light, are employed to illustrate different intensities and higher intensities are assigned to lighter colors.

8. The system of claim 5 wherein said system includes an alert for lightning detected within a predetermined distance dependent on a selected display scale.

9. The system of claim 8 wherein the predetermined distance is about 25 nmi.

10. The system of claim 5 where the processor means includes means for identifying different regions based on locating contiguous groups of hexagonal elements having an assigned color lighter than a predetermined color, and wherein the processor means includes means for generating statistical information respecting lightning activity in said different regions and display signals allowing display of the statistical information.

11. The system of claim 10 wherein the statistical information includes at least one of strike rate, strike trend and strike polarity.

12. The system of claim 1 wherein the processor means determines range of selected lightning strikes based on a time duration of a feature of a received signal waveform.

13. The system of claim 12 wherein the processor means identifies cloud to ground strikes and other strikes and said determined range depends on whether the strike is determined to be a cloud to ground strike or another strike different from a cloud to ground strike.

14. The system of claim 1 which further includes an operator control to allow an operator to select an overlay display mode in which the display signals illustrate the cumulative effect within the display region overlaid with locations of flashes within the same display region.

15. The system of claim 1 wherein the processor means maintains plural, time displaced samples in a plurality of channels, and further includes a saturation detector for each of said plural channels and means for retaining a prior sample for a particular channel at a time saturation is detected in said particular channel.

16. The system of claim 15 wherein the processor means includes a pair of loop channels and a sense channel and wherein the processor means maintains plural, time displaced samples in all said channels and wherein on detection of saturation in either of said loop channels, prior samples in both said loop channels are retained.

17. The system of claim 16 wherein the processor means determines bearing to a strike based on at least one of said retained samples.

18. The system of claim 16 wherein the processor means maintains a measure of waveform width in waveforms from said loop channels contemporaneous with development of said waveforms, and wherein on detection of saturation in a particular channel, strike range is determined based on said measure of loop waveform width in the particular channel.

19. The system of claim 18 wherein the processor means determines strike range based on waveform width in a loop channel which saturates and waveform amplitude in another loop channel not exhibiting saturation.

20. The system of claim 18 wherein the processor means determines strike range based on waveform width in loop channels when both said loop channels exhibit saturation.

21. The system of claim 3 which includes an alert responsive to detection of lightning within a predetermined range from the aircraft for audibly alerting the presence of the lightning within the predetermined range.

22. The system of claim 21 wherein the alert identifies range and bearing.

23. The system of claim 22 which includes an operator controlled inhibit for the alert.

24. The system of claim 7 wherein the processor means further generates selected display signals representing strikes and in which said selected display signals represent, for a particular strike, a color identical to a color assigned to a hexagonal element collocated with said strike.

25. The system as recited in claim 24 wherein said processor means omits from selected display signals indications of strikes collocated with hexagonal elements of at least one color other than black.

26. A system as recited in claim 1 wherein said cumulative effect on at least one location is dependent on a first parameter comprising a number of strikes making up a flash and a second parameter comprising a ratio of a first range between a location of said flash and said one location and a second range identifying a maximum range at which a flash has an effect.

27. A method for detecting lightning activity comprising:
   receiving electromagnetic energy emitted by lightning strikes in a receiver, processing signals from the receiver
      for estimating locations of lightning strikes relative to the receiver and
      for determining a cumulative effect, on a plurality of locations arranged in a regular array of plural lightning strikes spaced in distance from each other and from the locations and spaced in time from each other, and
   generating display signals to illustrate said cumulative effect with respect to said regular array.

28. A method as recited in claim 27 wherein said receiving is effected onboard an aircraft.

29. The method of claim 27 wherein the regular array comprises a grid of hexagonal elements.

30. The method of claim 29 wherein the display signals illustrate said cumulative effect within a selectable display region and wherein a hexagonal element of the array is assigned a color based on intensity of the determined cumulative effect for that particular hexagonal element.

31. The method of claim 30 wherein the color assigned to a hexagonal element is based on the intensity of the cumulative effect and a selected range scale of a related display.

32. The method of claim 30 wherein different colors, ranging from dark to light, are employed to illustrate different intensities and higher intensities are assigned to lighter colors.

33. The method of claim 30 further including generating an alert for lightning detected within a predetermined distance dependent on a selected display scale.

34. The method of claim 33 wherein the predetermined distance is about 25 nmi.

35. The method of claim 27 which further includes identifying different regions based on locating contiguous groups of hexagonal elements having an assigned color lighter than a predetermined color, generating statistical information respecting lightning activity in said different regions, and generating display signals allowing display of the statistical information.

36. The method of claim 35 wherein the statistical information includes at least one of strike rate, strike trend and strike polarity.

37. The method of claim 27 further including determining range of selected lightning strikes based on a time duration of a feature of a received signal waveform.

38. The method of claim 37 further including identifying cloud to ground strikes and other strikes and said determined range depends on whether the strike is determined to be a cloud to ground strike or another strike, different from a cloud to ground strike.

39. The method of claim 27 further providing an operator control to select an overlay display mode in which the display signals illustrate the cumulative effect within the display region overlaid with locations of flashes within the same display region.

40. The method of claim 27 which further includes maintaining plural, time displaced samples in a plurality of channels, detecting saturation in any of said plural channels, and retaining a prior sample for a particular channel at a time saturation is detected in said particular channel.

41. The method of claim 40 which includes providing a pair of loop channels and a sense channel and wherein the maintaining includes maintaining plural, time displaced samples in all said channels and wherein on detection of saturation in either of said loop channels, prior samples in both said loop channels are retained.

42. The method of claim 41 which includes determining bearing to a strike based on at least one of said retained samples.

43. The method of claim 41 which includes maintaining a measure of waveform width in waveforms from said loop channels contemporaneous with development of said waveforms, and wherein on detection of saturation in a particular channel, strike range is determined based on said measure of loop waveform width in the particular channel.

44. The method of claim 42 which further includes determining strike range based on waveform width in a loop channel which saturates and waveform amplitude in another loop channel not exhibiting saturation.

45. The method of claim 42 which further includes determining strike range based on waveform width in loop channels when both said loop channels exhibit saturation.

46. The method of claim 28 which further includes providing an alert, responsive to detection of lightning within a predetermined range from the aircraft for audibly alerting the presence of the lightning within the predetermined range.

47. The method of claim 46 wherein the alert identifies range and bearing.

48. The method of claim 46 which includes providing an operator controlled inhibit for the alert.

49. The method of claim 32 further including generating selected display signals representing strikes in which said display signals represent, for a particular strike, a color identical to a color assigned to a hexagonal element collocated with said strike.

50. The method as recited in claim 49 wherein said selected display signals omit indications of strikes collocated with hexagonal elements of at least one color other than black.

51. A method as recited in claim 27 wherein said cumulative effect on at least one location is dependent a first parameter comprising a number of strikes making up a flash and a second parameter comprising a ratio of a first range between a location of said flash and said one location and a second range identifying a maximum range at which a flash has an effect.

52. A system for detecting lightning strikes based on features of waveforms of received energy, said system comprising:
a wide band receiver for detecting energy emitted by lightning strikes, said receiver having at least one loop channel and at least one sense channel, each of said channels generating a related signal and coupled to a signal sampler,
said signal sampler generating sequences of samples for each of said signals,
a signal processor responsive to said sequences of samples of said signals for generating, for each of said signals a plurality of waveform parameters, said signal processor deriving a plurality of parameters measured in signal magnitude as well as at least one parameter measured in a time duration, and said processor for processing said waveform parameters to reject signals having characteristics inconsistent with a lightning strike.

53. The system of claim 52 wherein the sampler generates, for each of said channels samples representing a running average for each of a group of n most recent samples, where n is an integer larger than unity.

54. The system of claim 52 wherein said wide band receiver includes plural loop channels.

55. The system of claim 52 wherein said waveform parameters includes pulse rise time and said processor rejects signals with a rise time longer than a predetermined duration.

56. The system of claim 55 wherein said predetermined duration is about 10-12 microseconds.

57. The system of claim 54 wherein one of said waveform parameters represents a maximum amplitude (MAXLOOP) on either of said loop channels and wherein said processor rejects signals wherein maximum sense channel magnitude S fails to satisfy about 3MAXLOOP<S<about 0.75 MAXLOOP.

58. The system of claim 53 wherein the processor rejects signals where a loop signal exhibits a peak other than a maximum peak, and preceding said maximum peak which is more than about 25% of maximum peak amplitude.

59. The system of claim 53 wherein the processor rejects signals where a sense channel overshoot peak is not less than or equal to about 110% of the First Peak in that channel.

60. The system of claim 53 wherein the processor rejects signals where the Max Peak Max Loop is not less than about 110% of a First Peak magnitude.

61. The system of claim 53 wherein the processor rejects signals where the duration of the signal is greater than a predetermined amount.

62. The system of claim 61 wherein the predetermined amount is about one millisecond.

63. The system of claim 53 wherein the processor rejects signals wherein a duration extending between a max loop channel parameter reaching zero and the time a sense channel magnitude reaches zero is greater than a predetermined duration.

64. The system of claim 63 wherein the predetermined duration is about 7 microseconds.

65. The system of claim 53 wherein the processor rejects signals with a continuous wave frequency content in excess of a predetermined frequency and magnitude in excess of a predetermined magnitude.

66. The system of claim 65 wherein the continuous wave frequency content is estimated by counting selected zero crossings.

67. The system of claim 65 wherein the selected zero crossings are related to peaks in excess of a predetermined threshold.

68. The system of claim 67 wherein the predetermined threshold ZTL is defined in a register.

69. The system of claim 65 wherein the predetermined frequency is about 57 kHz.

70. A method for detecting lightning strikes based on features of waveforms of received energy, said method comprising:
   receiving energy emitted by lightning strikes via at least one loop channel and at least one sense channel, each of said channels generating a related signal,
   sampling signals from said at least one loop channel and at least one sense channel to generate sequences of samples for each of said signals,
   generating for each of said signals, in response to said sequences of samples, a plurality of waveform parameters, said plurality of parameters measured in signal magnitude as well as at least one parameter measured in a time duration, and
   rejecting signals having characteristics inconsistent with a lightning strike.

71. The method of claim 70 which further includes generating, for each of said channels samples representing a running average for each of a group of n most recent samples, where n is an integer larger than unity.

72. The method of claim 70 which includes two loop channels.

73. The method of claim 70 wherein said waveform parameters includes pulse rise time and said rejecting includes rejecting signals with a rise time longer than a predetermined duration.

74. The method of claim 72 wherein said predetermined duration is about 10-12 microseconds.

75. The method of claim 72 wherein one of said waveform parameters represents a maximum amplitude (MAXLOOP) on either of said loop channels and wherein said rejecting includes rejecting signals wherein maximum sense channel magnitude S fails to satisfy about 3 MAXLOOP<S<about 0.75 MAXLOOP.

76. The method of claim 70 wherein said rejecting includes rejecting signals where a loop signal exhibits a peak other than a maximum peak, and preceding said maximum peak which is more than about 25% of maximum peak amplitude.

77. The method of claim 70 wherein said rejecting rejects signals where a sense channel overshoot peak is not less than or equal to about 110% of the First Peak in that channel.

78. The method of claim 70 wherein the rejecting includes rejecting signals where the Max Peak Max Loop is not less than about 110% of a First Peak magnitude.

79. The method of claim 70 wherein the rejecting includes rejecting signals where the duration of the signal is greater than a predetermined amount.

80. The method of claim 79 wherein the predetermined amount is about one millisecond.

81. The method of claim 72 wherein the rejecting includes rejecting signals wherein a duration extending between a max loop channel parameter reaching zero and the time a sense channel magnitude reaches zero is greater than a predetermined duration.

82. The method of claim 81 wherein the predetermined duration is about 7 microseconds.

83. The method of claim 70 wherein the rejecting includes rejecting signals with a continuous wave frequency content in excess of a predetermined frequency and magnitude in excess of a predetermined magnitude.

84. The method of claim 83 wherein the continuous wave frequency content is estimated by counting selected zero crossings.

85. The method of claim 84 wherein the selected zero crossings are related to peaks in excess of a predetermined threshold.

86. The method of claim 85 wherein the predetermined threshold ZTL defined in a register.

87. The method of claim 83 wherein the predetermined frequency is about 57 kHz.

88. A system for detecting lightning activity comprising:
   a receiver for detecting energy emitted by lightning strikes, and a processor for processing signals from the receiver, said processor including
   means for estimating locations of detected lightning strikes relative to the system, means for determining a cumulative effect, on a plurality of locations arranged in a regular array, of plural lightning strikes spaced in distance from each other and from the locations and spaced in time from each other, and
   means for generating display signals to illustrate said cumulative effect.

89. The system of claim 88 wherein the regular array comprises a grid of hexagonal elements.

\* \* \* \* \*